United States Patent Office
3,332,953
Patented July 25, 1967

3,332,953
1,4-ETHANOISOQUINOLINES

Gordon Northrop Walker, Morristown, N.J., assignor to Ciba Corporation, New York, N.Y., a corporation of Delaware No Drawing. Filed Apr. 6, 1964, Ser. No. 357,778
2 Claims. (Cl. 260—289)

This is a continuation-in-part of application Serial No. 314,517, filed Oct. 7, 1963, now abandoned.

The present invention concerns N-substituted 1,4-dihydro-1,4-ethano-isoquinolinium compounds, particularly 2-R-3-$R_1$-4-$R_2$-1,4-dihydro-1,4-ethano-isoquinolinium salts, in which R is an organic radical having aliphatic characteristics, $R_1$ is an organic radical, and $R_2$ is hydrogen or an organic radical. More especially, the present invention relates to compounds of the formula

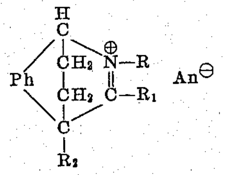

in which R, $R_1$ and $R_2$ have the previously-given meaning, and Ph is a 1,2-phenylene (or "o-phenylene") radical, and An$^{\ominus}$ is the anion of an acid.

An organic radical with aliphatic characteristics representing the group R stands, for example, for an aliphatic radical, such as alkyl, particularly lower alkyl, e.g. methyl, ethyl, n-propyl, isopropyl, n-butyl, isobutyl, n-pentyl, n-hexyl, n-heptyl and the like. It may also be higher alkyl, e.g. n-heptyl, n-octyl, n-nonyl, n-decyl, n-undecyl, n-dodecyl and the like, or alkenyl, such as lower alkenyl, e.g. allyl and the like, as well as a cycloaliphatic group, such as cycloalkyl having from three to eight, preferably from five to six, ring carbon atoms, e.g. cyclopentyl or cyclohexyl, as well as cyclopropyl, cycloheptyl and the like, or cycloalkenyl having from five to eight, preferably from five to six, ring carbon atoms, e.g. 2-cyclopentenyl, 1-cyclohexenyl, 3-cyclohexenyl and the like, as well as 1-cycloheptenyl, 3-cycloheptenyl, 1-cyclo-octenyl and the like, a cycloaliphatic-aliphatic group, such as cycloalkyl-lower alkyl, in which cycloalkyl has from three to eight, preferably from five to six, ring carbon atoms, e.g. cyclopentylmethyl, 3-cyclopentylpropyl, cyclohexylmethyl, 2-cyclohexylethyl and the like, as well as cyclopropylmethyl, 1-cyclopropylethyl, cycloheptylmethyl and the like, or cycloalkenyl-lower alkyl, in which cycloalkenyl has from five to eight, preferably from five to six, ring carbon atoms, e.g. 1-cyclopentenylmethyl, 2-cyclohexenylmethyl, 2-(3-cyclohexenyl)-ethyl and the like, or an aryl-aliphatic group, such as carbocyclic aryl-lower aliphatic groups, particularly monocyclic carbocyclic aryl-lower alkyl, for example, phenyl-lower alkyl, e.g. benzyl, 1-phenylethyl, 2-phenylethyl and the like, or substituted phenyl-lower alkyl, as well as bicyclic carbocyclic aryl-lower alkyl, for example, naphthyl-lower alkyl, e.g. 1-naphthylmethyl, 2-naphthylmethyl and the like, or substituted naphthyl-lower alkyl, or a heterocyclic aryl-lower aliphatic group, especially azacyclic aryl-lower alkyl, for example, pyridyl-lower alkyl, e.g. 2-pyridylmethyl, 4-pyridylmethyl and the like, or substituted pyridyl-lower alkyl, or any other suitable organic group having aliphatic characteristics.

The above organic radicals representing R, especially lower alkyl, may also have one or more than one of the same or of different substituents attached to any of the positions available for substitution. Substituents are, for example, lower alkyl, e.g. methyl, ethyl, n-propyl, isopropyl, n-butyl and the like, etherified hydroxyl, especially lower alkoxy, e.g. methoxy, ethoxy, n-propyloxy, butyloxy and the like, esterified hydroxyl, especially halogeno, e.g. fluoro, chloro, bromo and the like, amino, such as N,N-di-substituted amino, for example, N,N-di-lower alkyl-amino, e.g. N,N-dimethylamino, N,N-diethylamino and the like, N,N-alkyleneimino, in which alkylene has from four to seven carbon atoms, e.g. 1-pyrrolidino, 1-piperidino, 1-N,N-(1,6-hexylene)-imino and the like, trifluoromethyl, carboxy, carbo-lower alkoxy, e.g. carbomethoxy, carbethoxy and the like, or any other equivalent substituent.

An organic radical representing $R_1$ is more especially an organic radical having aliphatic characteristics, such as one of the above groups representing R, especially lower alkyl. However, other organic radicals representing $R_1$ are aryl groups, such as carbocyclic aryl, e.g. phenyl or substituted phenyl, naphthyl or substituted naphthyl and the like, or heterocyclic aryl, such as azacyclic aryl, for example, pyridyl, e.g. 2-pyridyl, 3-pyridyl or 4-pyridyl, or substituted pyridyl, thiacyclic aryl, for example, thienyl, e.g. 2-thienyl and the like, or substituted thienyl, or oxacyclic aryl, for example, furyl, e.g. 2-furyl and the like, or substituted furyl, or any other aryl group, particularly those, in which one or more than one of the positions available for substitution is substituted, for example, by one of the previously mentioned substituents.

Although the 4-position of the 1,4-dihydro-1,4-ethano-isoquinolinium portion may be unsubstituted, it is preferably substituted by an organic radical. The group $R_2$, apart from being hydrogen, may, therefore, be one of the above organic radicals representing the group $R_1$, particularly an aryl group, such as carbocyclic aryl, especially monocyclic carbocyclic aryl, e.g. phenyl or substituted phenyl, such as (lower alkyl)-phenyl, (lower alkoxy)-phenyl, (halogeno)-phenyl, (N,N-di-lower alkyl-amino)-phenyl, (trifluoromethyl)-phenyl and the like.

The hexacyclic carbocyclic aryl portion of the 1,4-dihydro-1,4-ethano-isoquinolinium ring system, represented in the above formula by the divalent 1,2-phenylene group Ph, is unsubstituted or may be substituted by one or more than one of the same or of different substituents attached to any of the positions available for substitution. Substituents are those mentioned before, and substituted 1,2-phenylene radicals are primarily (lower alkyl)-1,2-phenylene, (lower alkoxy)-1,2-phenylene, (halogeno)-1,2-phenylene, (N,N-di-lower alkyl-amino)-1,2-phenylene, (trifluoromethyl)-1,2-phenylene and the like.

The anion portion of the 1,4-dihydro-1,4-ethano-isoquinolinium salts of this invention representing An$^{\ominus}$ in the above formula is the anion of an acid, especially the pharmaceutically acceptable anion of an acid, such as the anion of an inorganic acid, e.g. hydrochloric, hydrobromic, nitric, sulfuric, phosphoric acid and the like, as well as of an organic acid, such as an organic carboxylic acid, e.g. acetic, propionic, glycolic, malonic, succinic, maleic, hydroxymaleic, fumaric, malic, tartaric, citric, benzoic, salicyclic, 4-aminosalicylic, 2-acetyloxybenzoic, nicotinic, isonicotinic acid and the like, or of an organic sulfonic acid, e.g. methane sulfonic, ethane sulfonic, ethane 1,2-disulfonic, 2-hydroxyethane sulfonic, benzene sulfonic, toluene sulfonic, naphthalene 2-sulfonic acid and the like. Other anions representing An$^{\ominus}$ are, for example, those of acidic organic nitro compounds, e.g. picric, picrolonic, flavianic acid and the like, of heavy metal complex acids, e.g. phosphotungstic, phosphomolybdic, chloroplatinic, Reinecke acid and the like, or of other acids forming suitable anions, e.g. perchloric acid and the like; compounds having anions of such acids are, for example, useful as intermediates in the manufacture of compounds having other anions, as well as for identification or characterization purposes.

The compounds of this invention may be in the form

›f mixtures of isomeric compounds or of single isomers; hus, they may be in the form of racemates or optically ıctive antipodes.

Resulting compounds or derivatives thereof may conain water and/or solvent of crystallization.

Apart from serving as intermediates (for example, or the preparation of 2-substituted 3-$R_1$-4-$R_2$-1,4-ethano-,2,3,4-tetrahydro-isoquinolines, in which $R_1$ and $R_2$ have he previously given meaning, according to the procedure escribed in my copending patent application Ser. No. 14,494, filed Oct. 7, 1963, and entitled "Bridged Comounds," now abandoned), the compounds of this inention exhibit pronounced diuretic, natriuretic and chloiuretic properties. A particular advantage of compounds f this invention is their lack of kaliuresis, which usully accompanies the diuretic natriuretic and chloriuretic roperties of known non-mercurial diuretic compounds. 'he compounds of this invention are, therefore, useful as iuretic, natriuretic and chloriuretic agents, for example, ı the treatment of excessive water, sodium and chlorine ›tention due, for example, to heart failure, kidney conitions and the like. Furthermore, compounds of this ıvention have antihypertensive properties and are, there›re, useful as antihypertensive agents in the treatment f hypertension, as are other non-mercurial diuretics, ıch as the hydrochlorothiazide and hydroflumethiazide iuretics.

Especially useful are the quaternary 2,3-di-lower alkyl-$R_2'$1,4-dihydro-1,4-ethano-isoquinolinium salts of the ›rmula

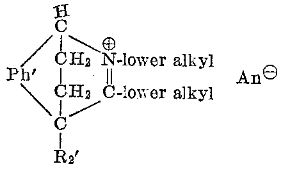

which Ph' is 1,2-phenylene, as well as (lower alkyl)-2-phenylene, (lower alkoxy)-1,2-phenylene, (halogeno)-2-phenylene, (N,N-di-lower alkyl-amino)-1,2-phenylene ' (trifluoromethyl)-1,2-phenylene, $R_2'$ is phenyl, as well (lower alkyl)-phenyl, (lower alkoxy)-phenyl, (halo-ıno)-phenyl, (N,N-di-lower alkyl-amino)-phenyl or (tri-ıoromethyl)-phenyl, and An⊖ has the previously-given eaning, but is especially the anion of a pharmaceutically ceptable acid, particularly a hydrohalic acid, as well any of the above acids. These compounds are reprented by the 2-lower alkyl-3-methyl-4-phenyl-1,4-dihyo-1,4-ethano-isoquinolinum halides.

The compounds of this invention are used in the form compositions for enteral, e.g. oral and the like, or parteral use, which contain a pharmacologically effective ıount of the active compound of this invention in adixture with a pharmaceutically acceptable organic or ›rganic, solid or liquid carrier, which usually repreıts the major portion of the pharmaceutical composiın. For making up the later, there are employed the ual carrier materials suitable for the manufacture of armaceutical compositions, such as water, gelatine, gars, e.g. lactose, sucrose, glucose and the like, starches, ;. corn starch, wheat starch, rice starch and the like, :aric acid or salts thereof, e.g., magnesium stearate, calım stearate and the like, talc, vegetable oils, ethanol, :aryl alcohol, benzyl alcohol, gums, acacia, tragaıth, polyalkylene glycols, propylene glycol or any other itable excipient or mixtures thereof. The compositions ıy be in solid form, e.g. capsules, tablets, dragees and : like, or in liquid form, e.g. solutions, suspensions, ıulsions and the like. If desired, they may contain auxily substances, such as preserving, stabilizing, wetting, ıulsifying, coloring, flavoring agents and the like, salts · varying the osmotic pressure, buffers, etc. The above ›parations are prepared according to the standard meth‑s used for the manufacture of pharmaceutically acceptable compositions, which, if desired, may also contain, in combination, other physiologically useful substances, particularly antihypertensive reagents, such as a reserpine-type compound, e.g. reserpine, deserpidine, syrosingopine and the like, a hydrazino-phthalazine, e.g. 1-hydrazino-phthalazine, 1,4-dihydrazino, phthalazine and the like, an α-amino-acid, e.g. α-methyldopa and the like, an anti-hypertensive monoamineoxidase inhibitor, e.g. pargyline and the like, or any other antihypertensive agent, as well as another diuretic and saluretic agent, such as a compound of the 1,2,4-benzathiadazine-1,1-dioxide series, e.g. chlorothiazide, hydrochlorothiazide, methyclothiazide, trichloromethiazide, bendroflumethiazide, polythiazide, hydroflumethiazide and the like, of the quinazolin-4-one series, e.g. quinethazone and the like, or of the phthalimidine series, e.g. chlorthalidone and the like.

The compounds of this invention are prepared, for example, by reacting an N-unsubstituted 3-$R_1$-4-$R_2$-1,4-dihydro-1,4-ethano-isoquinoline, particularly a compound of the formula

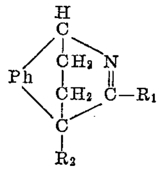

in which Ph, $R_1$ and $R_2$ have the previously-given meaning, with the reactive ester of an alcohol of the formula R—OH, in which R has the previously-given meaning, and, if desired, converting in a resulting quaternary ammonium compound the anion into another anion, and/or, if desired, separating a resulting mixture of isomers into the single isomers.

The above reaction is carried out according to known methods. The ester of an alcohol having aliphatic characteristics is more particularly the ester with an inorganic acid, for eaxmple, a hydrohalic acid, e.g. hydrochloric, hydrobromic, hydriodic acid and the like, sulfuric acid and the like, as well as the ester with a strong organic acid, particularly a strong organic sulfonic acid, e.g. methane sulfonic, ethane sulfonic, 2-hydroxy-ethane sulfonic, benzene sulfonic, 4-bromo-benzene sulfonic, p-toluene sulfonic acid and the like, or of any other suitable acid. Particularly useful as reactive esters of alcohols having aliphatic characteristics are organic halides having aliphatic characteristics, such as aliphatic halides, especially lower alkyl halides, e.g. methyl, ethyl, n-propyl, isopropyl, n-butyl, isobutyl, n-pentyl, n-hexyl or n-heptyl chloride, bromide or iodide and the like, as well as higher alkyl halides, as well as alkenyl halides, e.g. allyl or methallyl chloride, bromide or iodide and the like, cycloaliphatic halides, such as cycloalkyl halides, in which cycloalkyl has from three to eight, preferably from five to six, ring carbon atoms, e.g. cyclopropyl, cyclopentyl, cyclohexyl or cycloheptyl chloride, bromide or iodide and the like, cycloaliphatic-aliphatic halides, especially cycloalkyl-lower alkyl halides, in which cycloalkyl has from three to eight, preferably from five to six, ring carbon atoms, e.g. cyclopropylmethyl, cyclopentylmethyl, 3-cyclopentylpropyl, cyclohexylmethyl, 2-cyclohexylethyl or cycloheptylmethyl chloride, bromide or iodide and the like, and, particularly, aryl-aliphatic halides, especially monocyclic carbocyclic aryl-lower alkyl halides, such as the phenyl-lower alkyl halides, e.g. benzyl, 1-phenylethyl or 2-phenylethyl chloride, bromide or iodide, or any other suitable organic halide of aliphatic characteristics. Also useful as reactive esterified alcohols are organic sulfates, such as di-aliphatic sulfates, especially di-lower alkyl-sulfates, e.g. dimethyl sulfate, diethyl sulfate and the like, or organic sulfonates having aliphatic characteristics, such as aliphatic organic sulfonates, for example, lower alkyl organic sulfonates, e.g. methyl or ethyl methane sulfonate, ethane sulfonate, 2-hydroxyethane sulfonate, benzene sulfonate, 4-bromo-benzene sulfonate, p-toluene sulfonate or naphthalene 2-sulfonate and the like, or any other reactive ester of an alcohol having aliphatic characteristics.

The reaction is carried out in the absence or presence of a solvent, while cooling, at room temperature or at an elevated temperature; at atmospheric pressure or in a closed vessel under pressure; and, if necessary, in the atmosphere of an inert gas, e.g. nitrogen. Suitable diluents are more especially lower alkanols, e.g. methanol, ethanol, n-propanol, isopropanol, tertiary butanol, n-pentanol and the like, lower alkanones, e.g. acetone, ethyl methyl ketone and the like, organic acid amides, e.g. formamide, N,N-dimethylformamide and the like, aliphatic hydrocarbons, e.g. pentane, hexane and the like, halogenated hydrocarbon, e.g. methylene chloride, ethylene chloride and the like, monocyclic carbocyclic aryl hydrocarbon, e.g. benzene, toluene and the like, or any other suitable solvent or solvent mixture.

The starting materials having the hitherto unknown 1,4-dihydro-1,4-ethano-isoquinoline ring system and used in the above reaction, as well as the salts thereof, the N-oxides thereof or the salts of the N-oxides thereof, are new and are intended to be included within the scope of this invention. Apart from being useful as intermediates for the preparation of the pharmacologically active quaternary ammonium compounds of this invention, they are also useful as intermediates for the preparation of the corresponding 2-unsubstituted 3-$R_1$-4-$R_2$-1,4-ethano-1,2,3,4-tetrahydro-isoquinolines, in which $R_1$ and $R_2$ have the previously-given meaning, according to the procedure described in my copending patent application Ser. No. 314,494, filed Oct. 7, 1963, and entitled "Bridged Compounds." Derivatives of the above 2-unsubstituted 3-$R_1$-4-$R_2$-1,4-dihydro-1,4-ethano-isoquinolines, such as their salts, N-oxides or salts of N-oxides, are useful as intermediates for their purification and/or identification; formation of these particular derivatives and their conversion into the parent compounds is achieved according to the methods described below.

Salts of the starting materials are acid addition salts thereof, such as those with inorganic or organic salts, for example, those with the acids furnishing the anion of the quaternary compounds. N-oxides also form addition salts with acids, such as those mentioned above.

Especially useful starting materials are those of the formula

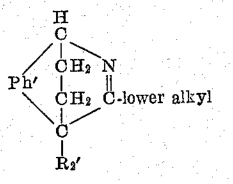

in which the Ph' and $R_2'$ have the previously-given meaning, as well as the acid addition salts thereof.

The above starting materials are prepared, for example, by ring-closing a 4-[$R_1$—C(=O)]-4-$R_2$-4-monocyclic carbocyclic aryl-butyric acid compound, in which at least one of the ortho-positions of the monocyclic carbocyclic aryl portion is unsubstituted, such as a compound of the formula

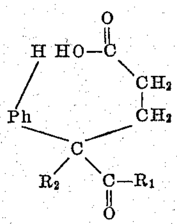

in which Ph, $R_1$ and $R_2$ have the previously-given meaning, or a suitable derivative thereof, converting at least one of the oxo groups in a resulting 4-[$R_1$—C(=O)]-4-$R_2$-1,2,3,4-tetrahydro-naphthalene-1-one, such as a compound of the formula

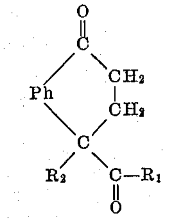

in which Ph, $R_1$ and $R_2$ have the previously-given meaning, into a functionally converted, nitrogen-containing oxo group capable of being converted into amino by reduction, and treating a resulting 1-$X_1$-4-[$R_1$—C(=$X_2$)]-4-$R_2$-1,2,3,4-tetrahydro-naphthalene compound, such as a compound of the formula

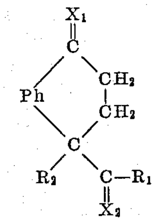

in which Ph, $R_1$ and $R_2$ have the previously-given meaning, and in which one of the groups $X_1$ and $X_2$ is a functionally converted, nitrogen-containing oxo group capable of being converted into amino by reduction, and the other is an oxo group of a functionally converted, nitrogen-containing oxo group capable of being converted into amino by reduction, or a salt thereof, with a theoretical amount of two molar equivalents of hydrogen in presence of a metal catalyst, and, if desired, converting a resulting salt into the free compound or into another salt, and/or, if desired, converting a resulting compound into an N-oxide, and/or, if desired, converting a resulting compound or an N-oxide thereof into a salt thereof, and/or, if desired, converting a resulting N-oxide into the free tertiary compound, and/or, if desired, separating a resulting mixture of isomeric compounds into the single isomers.

Ring-closure of a 4-[$R_1$—C(=O)]-4-$R_2$-4-monocyclic carbocyclic aryl-butyric acid intermediate or a suitable derivative thereof, such as an ester, for example, a lower alkyl ester, thereof, or a halide, such as a chloride, thereof, is achieved according to known methods, preferably by treatment with a suitable acidic ring closing reagent (e.g. sulfuric acid, hydrochloric acid, polyphosphoric acid, aluminum chloride, stannic chloride and the like), if necessary, while cooling or at an elevated temperature, and in the presence of a diluent medium.

A functionally converted, nitrogen-containing oxo group capable of being converted into amino by reduction, is above all a hydroxyimino group, but may also be an imino group. Formation of such group from an oxo group is achieved according to known methods, for example, by treating the 4-[$R_1$—C(=O)]-4-$R_2$-1,2,3,4-tetrahydro-naphthalen-1-one compound with a suitable reagent capable of converting an oxo group into a functionally converted, nitrogen-containing oxo group capable of being converted into amino by reduction, above all with hydroxylamine, or, especially, an acid addition salt thereof, such as the hydrochloride, sulfate and the like thereof. The hydroxylamine reagent, which gives rise to the formation of 1-$X_1$-4-[$R_1$—C(=$X_2$)]-4-$R_2$-1,2,3,4-tetrahydro-naphthalenes, in which one of the groups $X_1$ and $X_2$ is a hydroxyimino group, and the other is oxo or a hydroxyimino group, is preferably used in the presence of a diluent; in case an acid addition salt of hydroxylamine represents the reagent, a base, e.g. sodium hydroxide, potassium hydroxide and the like, is employed. If necessary, the reaction is carried out while cooling or ıt an elevated temperature, in a closed vessel, and/or in he atmosphere of an inert gas, e.g. nitrogen. Ammonia, ınder certain conditions (for example, in a closed vessel nd at elevated temperatures), may be used for the con'ersion of an oxo group into an imino group.

Although in a resulting 1-$X_1$-4-[$R_1$—C(=$X_2$)]-4-$R_2$-,2,3,4-tetrahydro-naphthalene compound, which may be onverted into a salt thereof, only one of the groups $X_1$ nd $X_2$, preferably $X_1$, has to be a functionally converted, itrogen-containing oxo group capable of being converted ıto amino by reduction, particularly a hydroxyimino roup, both groups may represent functionally converted, itrogen-containing oxo groups capable of being conerted into amino by reduction, particuarly hydroxyimino roups. Salts of the intermediate compounds are acid adition salts thereof; they are formed according to the proedure described below.

Treatment of the resulting 1-$X_1$-4-[$R_1$—C(=$X_2$)]-4-$_2$-1,2,3,4-tetrahydro-naphthalene intermediate with hyrogen is carried out in the presence of a metal catalyst, ontaining a suitable heavy metal element of Group VIII f the Periodic System (i.e. a metal element of the 'ransition *b* Group), particularly palladium, as well as latinum, nickel, rhodium, rhutenium and the like. referred catalysts are palladium-on-charcoal catalysts; thers are platinum black, Raney nickel, rhodium-onluminum oxide and the like. The hydrogenation reaction performed under per se known conditions, preferably ı the presence of a suitable solvent or solvent mixture, ıd, if necessary, at an elevated temperature, and/or ı a closed vessel under pressure. The theoretical up-take f hydrogen is two molar equivalents; however, a slight ıcess of hydrogen absorption does not greatly impair ıe yields of the desired 1,4-dihydro-1,4-ethano-isoquinone starting material.

The intermediate compounds formed in the above rocedure are new and are intended to be included within ıe scope of this invention. Preferred 4-[$R_1$—C(=O)]-4-$_2$-1,2,3,4-tetrahydronaphthalen-1-one compounds are 4-wer alkanoyl - 4 - $R_2'$-1,2,3,4-tetrahydro-naphthalen-1-ıes, especially the compounds of the formula

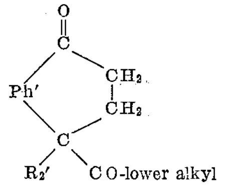

which Ph' and $R_2'$ have the previously-given meaning. the 1 - $X_1$4 - [$R_1$—C(=$X_2$)]-4-$R_2$-1,2,3,4 - tetrahydroıphthalenes, a functionally converted, nitrogen-containg group capable of being converted into amino by duction, and representing $X_1$ and/or $X_2$ is primarily hydroxyimino group; the preferred intermediates are e 1-hydroxyimino-4-lower alkanoyl-4-$R_2'$-1,2,3,4-tetra'dro-naphthalenes and 4-lower alkanoyl-4-$R_2'$-1,2,3,4-trahydro-naphthalen-1-one dioximes, especially the comıunds of the formula

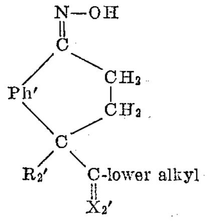

which Ph' and $R_2'$ have the previously-given meaning, d $X_2'$ is oxo or hydroxyimino, or acid addition salts ereof.

Also included within the scope of this invention is the ıt step of the procedure for the preparation of the ırting material, i.e. the preparation of the 2-R-3-$R_1$-4-$R_2$-1,4-dihydro-1,4-ethano-isoquinoline by treating a 1 - $X_1$-4-[$R_1$—C(=$X_2$)]-4-$R_2$-1,2,3,4-tetrahydro-naphthalene compound, in which $R_1$ and $R_2$ have the previously-given meaning, and one of the groups $X_1$ and $X_2$ is a functionally converted, nitrogen-containing oxo group capable of being converted into amino by reduction, particularly a hydroxyimino group, and the other is an oxo group or a functionally converted, nitrogen-containing oxo group capable of being converted into amino by reduction, or salt thereof, with a theoretical amount of two molar equivalents of hydrogen in the presence of a metal catalyst, and, if desired, carrying out the optional steps.

The pharmacologically useful 2-R-3-$R_1$-4-$R_2$-1,4-dihydro-1,4-ethano-isoquinolinium salts of this invention, in which R and $R_2$ have the previously-given meaning, and $R_1$ is an organic radical of aliphatic characteristics, the α-carbon atom of which has at least one hydrogen, are also prepared, for example, by reacting a 2-R-3-$R_1°$-4-$R_2$-1,2,3,4-tetrahydro-1,4-ethano-isoquinoline, especially a compound of the formula

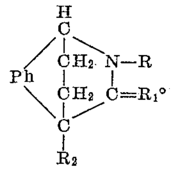

in which Ph, R and $R_2$ have the previously-given meaning, and $R_1°$ is an organic ylidene radical having aliphatic characteristics, with an acid, as well as with a reactive ester of a sterically hindered alcohol having aliphatic characteristics and a proton source, and, if desired, carrying out the optional steps.

The organic ylidene radical $R_1°$ represents an organic group of aliphatic characteristics, in which the α-carbon substitutes the carbon atom representing the 3-position of the 1,2,3,4-tetrahydro-1,4-ethano-isoquinoline ring system through a carbon-to-carbon double bond. The group $R_1°$ is above all a lower alkylidene group, e.g. methylene, ethylidene, n-propylidene, isopropylidene, n-butylidene and the like, but may be any other suitable organic ylidene radical having aliphatic characteristics, such as a cycloaliphatic ylidene radical, for example, cycloalkylidene having from three to eight, preferably from five to six, ring carbon atoms, e.g. cyclopentylidene, cyclohexylidene and the like, a cycloaliphatic-aliphatic ylidene radical, for example, cycloalkyl-lower alkylidene, in which cycloalkyl has from three to eight, preferably from five to six, ring carbon atoms, e.g. cyclopentylmethylene, 3-cyclopentylpropylidene, cyclohexylmethylene, 2-cyclohexylethylidene and the like, an aryl-aliphatic ylidene radical, such as a carbocyclic aryl-aliphatic ylidene radical, particularly monocyclic carbocyclic aryl-lower alkylidene, such as phenyl-lower alkylidene, e.g. benzylidene, 1-phenylethylidene, 2-phenylethylidene and the like, or any other suitable organic ylidene group having aliphatic characteristics.

The acid used in the above reaction, which, in the case of a hydrohalic acid, e.g. hydrochloric, hydrobromic acid and the like, may be in gaseous form, or a solution thereof in a solvent or solvent mixture, is added to the starting material or a solution thereof; if necessary, the reaction is carried out while cooling or at an elevated temperature, and/or, in the atmosphere of an inert gas, e.g. nitrogen.

A reactive ester of a sterically hindered alcohol having aliphatic characteristics is particularly an ester thereof with a strong inorganic acid, such as hydrochloric, hydrobromic, hydriodic, sulfuric acid and the like, or with a strong organic sulfonic acid, e.g. methane sulfonic, 2-hydroxyethane sulfonic, p-toluene sulfonic acid and the like. A sterically hindered alcohol of aliphatic characteristics is either a primary higher alkanol or a secondary or tertiary alkanol, a cycloalkanol or any other analogous aliphatic alcohol, particularly an aryl-aliphatic alcohol, such as a monocyclic carbocyclic aryl-lower alkanol, especially a phenyl-lower alkanol, e.g. benzyl alcohol and the like. Particularly useful esters of the above alcohols are either the primary higher alkyl halides, e.g. bromides, iodides and the like, or the secondary or tertiary alkyl halides, the cycloalkyl halides or any other analogous aliphatic halide, particularly the aryl-aliphatic halides, such as the monocyclic carbocyclic aryl-lower alkyl halides, especially the phenyl-lower alkyl halides, e.g. benzyl or 1-phenylethyl chloride or bromide and the like, or the corresponding organic sulfonates, particularly methane sulfonates, 2-hydroxyethane sulfonates, p-toluene sulfonates and the like.

The reaction of the starting material with a reactive ester of a sterically hindered alcohol having aliphatic characteristics is preferably carried out in the presence of a solvent or a solvent mixture, which may also serve as the proton source. The latter may be a lower alkanol, e.g. ethanol and the like, water or any other suitable reagent, or a moist solvent. The proton donor may be present in the reaction of the starting material with the reactive ester, or it may be used subsequently. If necessary, the reaction is carried out while cooling or at an elevated temperature, in a closed vessel, and/or, in the atmosphere of an inert gas.

The starting materials used in the above procedure are new and are intended to be included within the scope of this invention, including lower alkyl quaternary compounds thereof, in which lower alkyl has a sterically non-hindered α-carbon atom, especially non-branched lower alkyl, e.g. methyl, ethyl and the like. Particularly useful are the compounds of the formula

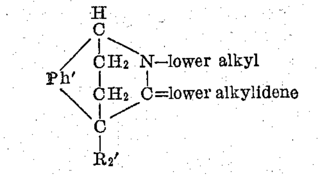

in which Ph′ and $R_2'$ have the previously given meanings, as well as lower alkyl quaternary compounds, particularly halides, in which lower alkyl is preferably unbranched.

The above starting materials are prepared, for example, by ring-closing an α-$R_2$-α-monocyclic carbocyclic arylglutaric acid, in which at least one of the ortho-positions of the monocyclic carbocyclic aryl portion is unsubstituted, such as a compound of the formula

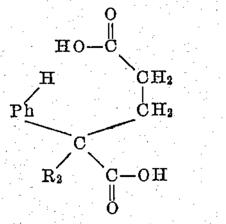

in which Ph and $R_2$ have the previously given meaning, or a suitable carboxylic acid derivative thereof, converting in a resulting 4-$R_2$-1,2,3,4-tetrahydro-naphthalen-1-one 4-carboxylic acid, such as a compound of the formula

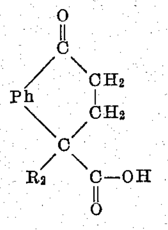

in which Ph and $R_2$ have the previously given meaning, or, more especially, in a suitable carboxylic acid derivative thereof, the oxo group into an N—R°-amino group, in which R° is hydrogen or an organic radical having aliphatic characteristics, ring-closing a resulting 1-(N—R°-amino)-4-$R_2$-1,2,3,4-tetrahydro-naphthalene 4-carboxylic acid, in which the N—R°-amino group and the carboxylic acid group have the cis-configuration, such as the compound of the formula

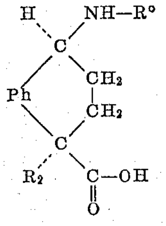

in which Ph, $R_2$ and R° have the previously-given meaning, or, more especially, a suitable carboxylic acid derivative thereof, as well as a salt of such compound, and, if necessary, after having replaced in a resulting 2-R°-4-$R_2$-1,2,3,4-tetrahydro-1,4-ethano-isoquinolin-3-one, in which R° is hydrogen, the latter by an organic radical having aliphatic characteristics, reacting a resulting 2-R-4-$R_2$-1,2,3,4-tetrahydro-1,4-ethano-isoquinolin-3-one, particularly a compound of the formula

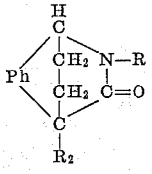

in which Ph, R and $R_2$ have the previously-given meaning with an organometallic reagent of the formula $M^{\oplus} R_1^{\ominus}$, in which $R_1^{\ominus}$ is an organic radical of aliphatic characteristics, the α-carbon atom of which has at least one hydrogen, and in which $M^{\oplus}$ stands for the positively charged ion of certain metals of the I–A group of the Periodic System, as well as for the positively charged ion of the formula Met—Hal⊕, in which Met represents certain divalent metals of the II–A-group and the II–B-group of the Periodic System, and Hal is halogeno, or with a tri-carbocyclic aryl-$R_1$°-phosphorane reagent, in which $R_1$° is an organic ylidene radical having aliphatic characteristics.

Ring-closure of an α-$R_2$-α-monocyclic carbocyclic arylglutaric acid, or of a carboxylic acid derivative thereof, such as an ester or a monoamide thereof, is usually accomplished by treatment with a suitable Lewis acid reagent, especially a mineral acid, such as sulfuric acid or hydrochloric acid, as well as polyphosphoric acid and the like, if desired, in the presence of a diluent, e.g. acetic acid and the like, and, if necessary, while cooling or at an elevated temperature, in a closed vessel, and/or, in the atmosphere of an inert gas.

Before carrying out the conversion of the oxo group in a resulting 4-$R_2$-1,2,3,4-tetrahydro-naphthalen-1-one 4-carboxylic acid into an N—R°-amino group, the carboxylic acid compound is preferably converted into a suitable derivative thereof, particularly into an ester, such as a lower alkyl ester, thereof. Such transformation is carried out according to known methods, for example, by treatment of the carboxylic acid compound with an alcohol, such as a lower alkanol, in the presence of an acid, e.g. sulfuric acid (usually a mixture of concentrated and fuming sulfuric acid) and the like, or with a suitable diazo-reagent, such as a lower diazo-alkane.

The conversion of the oxo group in a resulting 4-$R_2$-1,2,3,4-tetrahydro-naphthalen-1-one 4-carboxylic acid, or, more especially, a carboxylic acid derivative, such as an ester, thereof, into an N—R°-amino group is performed according to known methods. Thus, the 4-$R_2$-1,2,3,4-tetrahydro-naphthalen-1-one 4-carboxylic acid or a carboxylic acid derivative thereof, especially an ester thereof, may be reacted with hydroxylamine, or preferably a salt thereof, according to the previously-described procedure, and in the resulting 1-hydroxyimino-4-$R_2$-1,2,3,4-tetrahydro-naphthalene 4-carboxylic acid, or, more especially, a carboxylic acid derivative, particularly an ester, thereof, the hydroxyimino group is converted into amino according to the previously-described reduction procedure. Furthermore, upon treatment with a compound of the formula $R°$—$NH_2$, in which $R°$ is hydrogen or an organic radical having alphatic properties, preferably while azeotropically removing any generated water, the oxo group in a 4-$R_2$-1,2,3,4-tetrahydro-naphthalen-1-one 4-carboxylic acid or a carboxylic acid derivative thereof is transformed into an $R°$-imino group, which is then converted into an amino group by reduction according to known methods, for example, by treatment with sodium borohydride and the like. In addition, a 4-$R_2$-1,2,3,4-tetrahydro-naphthalen-1-one 4-carboxylic acid or a carboxylic acid derivative thereof may be reacted with ammonium formate or with an N—$R°$-formamide, at an elevated temperature (according to the procedure of the Leuckart reaction) to form 1-(N—$R°$-N-formyl-amino)-4-$R_2$-1,2,3,4-tetrahydro-naphthalene 4-carboxylic acid or a carboxylic acid derivative thereof, which is then hydrolyzed, for example, with water or with an acid, to yield the desired 1-(N—$R°$-amino)-4-$R_2$-1,2,3,4-tetrahydro-naphthalene 4-carboxylic acid or a carboxylic acid derivative thereof.

Usually, a mixture of both isomers of the 1-(N—$R°$-amino)-4-$R_2$-1,2,3,4-tetrahydro-naphthalene 4-carboxylic acid or the carboxylic acid derivative thereof are obtained, in which the N—$R°$-amino group and the carboxylic acid or functionally converted carboxylic acid group have the cis- and the trans-configuration, respectively. A separation of the two isomers is not necessary, as only the cis-isomer is capable of undergoing the desired ring-closure, and the basic trans-isomer is easily separated from the ring-closed 2-$R°$-4-$R_2$-1,2,3,4-tetrahydro-1,4-ethano-isoquinolin-3-one compound. If desired, a separation can be achieved on the basis of physico-chemical differences, either with the free compounds or with derivatives, e.g. the salts, thereof, for example, by fractional crystallization and the like.

Ring-closure of a 1-(N—$R°$-amino)-4-$R_2$-1,2,3,4,-tetrahydro-naphthalene 4-carboxylic acid or, more especially, of a carboxylic acid derivative thereof, particularly of a carboxylic acid ester, such as a lower alkyl ester, thereof, in which the N—$R°$-amino group and the carboxylic acid group or the functionally converted carboxylic acid group, particularly the carboxylic acid ester group, such as the carbo-lower alkoxy group, have the cis-configuration, occurs already at room temperature; however, it proceeds at a more accelerated rate, by heating it at an elevated temperature. The reaction is performed in the absence or in the presence of a solvent or mixture of solvents, and, if necessary, in a closed vessel and/or, in the atmosphere of an inert gas, e.g. nitrogen.

Replacement in a 2-$R°$-4-$R_2$-1,2,3,4-tetrahydro-1,4-ethano-isoquinolin-3-one, in which $R°$ is hydrogen, of the latter by an organic radical having aliphatic characteristics is carried out according to known methods. Thus, the intermediate or a salt thereof, such as an alkali metal salt thereof (prepared, for example, by treatment with a suitable salt-forming reagent, such as an alkali metal hydride or an alkali metal amide, e.g. lithium, sodium or potassium hydride or amide and the like, or with an alkali metal lower alkoxide, e.g. sodium or potassium methioxide, ethoxide or tertiary butoxide and the like, in the presence of an inert solvent or solvent mixture, or any other procedure), may be reacted with the reactive ester of an alcohol of the formula R—OH, in which R is an organic radical having aliphatic characteristics. The preferred reagents are lower alkyl halides, and the reaction is performed as previously described, preferably in the presence of a solvent or solvent mixture, and, if necessary, while cooling or at an elevated temperature, in a closed vessel and/or, in the atmosphere of an inert gas.

Treatment of a resulting 2-R-4-$R_2$-1,2,3,4-tetrahydro-1,4-ethano-isoquinolin-3-one compound with an organo-metallic $M^{\oplus}$ $R_1^{\ominus}$ is carried out according to known methods. The ion $M^{\oplus}$ represents, for example, the positive ion of an alkali metal, especially lithium, as well as sodium and the like, as well as the positive ion of the formula Hal—$Mg^{\oplus}$, in which Hal represents halogeno, e.g. chloro, bromo, iodo and the like. Both types of reagents are used under similar conditions; preferably, the alkali metal compound or the Grignard reagent is prepared separately and is then reacted with the ketone. The diluent used during the preparation of the organo-metallic reagent, for example, diethyl ether and the like, may be diluted or replaced by other solvents or solvent mixtures, for example, by another ether, such as a monocyclic carbocyclic aryl lower alkyl ether, e.g. anisole and the like, a di-monocyclic carbocyclic aryl-ether, e.g. diphenyl ether and the like, a cyclic ether, e.g. tetrahydrofuran, p-dioxane and the like, an organic base, e.g. pyridine, N-methyl-morpholine and the like, a monocyclic carbocyclic aryl hydrocarbon, e.g. benzene, toluene, xylene and the like, or an aliphatic hydrocarbon, e.g. pentane, hexane and the like, or any other suitable solvent or solvent mixture. If necessary, the reaction is carried out while cooling or at an elevated temperature; if necessary, the atmosphere of an inert gas, e.g. nitrogen, may be required, particularly when an alkali metal reagent is used. The resulting reaction mixture is worked up according to known methods; thus, a complex of organo-metallic nature may be broken, for example, by adding water, or a weak acid, such as acetic acid, ammonium chloride and the like, or an aqueous solution thereof.

The reaction of a resulting 2-R-4-$R_2$-1,2,3,4-tetrahydro-1,4-ethano-isoquinolin-3-one compound with a tri-carbocyclic aryl-$R_1°$-phosphorane reagent (a so-called Wittig reagent), in which $R_1°$ is an organic ylidene radical having aliphatic characteristics, and which is, more especially, a tri-monocyclic carbocyclic aryl-$R_1°$-phosphorane reagent, such as a lower alkylidene-triphenyl-phosphorane and the like, is carried out according to the procedure known as the Wittig reaction. The phosphorane reagent is prepared, for example, by reacting a tri-carbocyclic aryl-phosphine, such as a tri-monocyclic carbocyclic aryl-phosphine, particularly tri-phenyl-phosphine, with an organic halide of aliphatic characteristics, for example, a compound of the formula $R_1$—Hal, in which $R_1$ and Hal have the previously-given meaning, such as a lower alkyl halide, particularly bromide, as well as chloride or iodide, and treating a resulting tri-carbocyclic aryl-$R_1$-phosphonium halide, such as a tri-monocyclic carbocyclic aryl-$R_1$-phosphonium halide, particularly a lower alkyl-tri-phenyl-phosphonium halide, with an equivalent amount of a suitable base capable of eliminating hydrogen halide from the tri-carbocyclic aryl-$R_1$-phosphonium halide, such as a suitable alkali metal organic compound, for example, a lower alkyl alkali metal compound, e.g. n-butyl lithium and the like. Preferably, the tri-carbocyclic aryl-$R_1°$-phosphoran reagent is not isolated, but is reacted in solution with the inert solvent, e.g. tetrahydrofuran and the like, or solvent mixture, used during its preparation. Usually, the reagent and the 2-R-4-$R_2$-1,2,3,4-tetrahydro-1,4-ethano-isoquinolin-3-one compound are combined at room temperature, if necessary, in the atmosphere of an inert gas, e.g. ntrogen, and/or in a closed vessel; heating may be required to complete the reaction.

Several groups of intermediate compounds formed in the above procedure are new and are intended to be included within the scope of this procedure. Novel 4-$R_2$-1,2,3,4-tetrahydro-naphthalen-1-one 4-carboxylic acid compounds or carboxylic acid derivatives thereof, are especially those, in which $R_2$ is an aryl group. These compounds are represented by those of the previously given formula, $R_2$ being especially an aryl radical; preferred are the lower alkyl 4-$R_2$'-1,2,3,4-tetrahydro-napthalen-1-one 4-carboxylates, particularly those of the formula

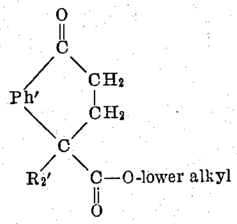

in which Ph' and $R_2$' have the previously given meaning.

The novel 1-(N—R°-amino)-4-$R_2$-1,2,3,4-tetrahydro-naphthalene carboxylic-4 acids are preferably in the form of their carboxylic acid esters, particularly their lower alkyl esters; those compounds, in which the N—R°-amino group and the carboxylic acid or carboxylic acid ester group have the cis-configuration, are preferred. These are represented by the compounds of the previous formula, particularly the carboxylic acid esters, such as the lower alkyl esters, thereof; preferred are the lower alkyl 1-amino-4-$R_2$'-1,2,3,4-tetrahydro-naphthalene 4-carboxylates, in which the amino group and the carbo-lower alkoxy group have the cis-configuration, especially those of the formula

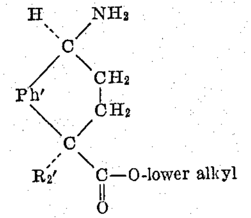

in which Ph' and $R_2$' have the previously-given meaning, as well as the acid addition salts thereof.

The 2-R°-4-$R_2$-1,2,3,4-tetrahydro - 1,4-ethano-isoquinolin-3-ones are represented by the compounds of the formula

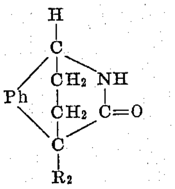

in which Ph and $R_2$ have the previously-given meaning, which compounds are converted according to the previously-described procedure into those of the formula

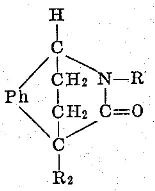

in which Ph, R and $R_2$ have the previously-given meaning, in order to serve as the intermediates for the preparation of the starting materials. The preferred compounds of this type are the 4-$R_2$'-1,2,3,4-tetrahydro-1,4-ethano-isoquinolin-3-ones and the 2-lower alkyl-4-$R_2$'-1,2,3,4-tetrahydro - 1,4-ethano-isoquinolin - 3-ones, especially those of the formulae

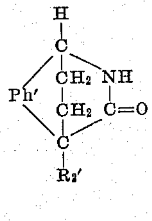

and

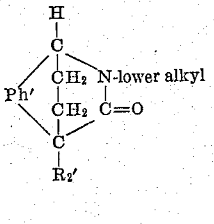

respectively, in which Ph' and R' have the previously-given meaning.

Also included within the scope of the invention is the process for the preparation of the 2-R-4-$R_2$-1,2,3,4-tetra-hydro-1,4-ethano-isoquinolin-3-ones, in which R and $R_2$ have the previously-given meaning, which comprises ring-closing a 1-(N—R°-amino)-4-$R_2$-1,2,3,4-tetrahydro-naphthalene 4-carboxylic acid ester, in which R° and $R_2$ have the previously-given meaning, and in which the N—R°-amino group and the carboxylic acid ester group have the cis-configuration, and, if necessary, replacing in a resulting 2-R°-4-$R_2$-1,2,3,4-tetrahydro - 1,4-ethano-isoquinolin-3-one, in which $R_2$ has the previously-given meaning, and R° is hydrogen, the latter by an organic radical having aliphatic characteristics and representing R. The above reaction is carried out as described before.

Furthermore, the scope of this invention also includes the procedure for the preparation of the 2-R-3-$R_1$°-4-$R_2$-1,2,3,4-tetrahydro-1,4-ethano-isoquinoline, in which R, $R_2$ and $R_1$° have the previously-given meaning, the latter being an organic ylidene radical having aliphatic characteristics, or a lower alkyl quaternary ammonium derivative thereof, which comprises reacting a 2-R-4-$R_2$-1,2,3,4-tetrahydro - 1,4-ethano-isoquinolin - 3-one, in which R and $R_2$ have the previously-given meaning, with an organo-metallic reagent of the formula $M^{\oplus} R_1^{\ominus}$, in which $R_1^{\ominus}$ and $M^{\oplus}$ have the previously-given meaning, or with a tri-carbocyclic aryl-$R_1$°-phosphorane reagent, in which $R_1$° has the previously-given meaning or a 2-R-3-$R_1$-4-$R_2$ - 1,4-dihydro - 1,4-ethano-isoquinolinium salt, in which R, $R_1$ and $R_2$ have the previously-given meaning, with a basic reagent (as shown below) and, if desired, converting a resulting compound into a lower alkyl quaternary ammonium derivative.

In the quaternary compounds of this invention, the anion may be replaced by another anion; such replacement is performed according to known methods. For example, a salt may be treated with a base or with a hydroxyl ion exchange preparation and a resulting basic compound, which may also be obtained by treating a halide salt with silver oxide or a sulfate salt with barium hydroxide, and the resulting basic compound is converted into a salt, for example, by reacting it with an acid, as well as with an anion exchange preparation. Furthermore, the anion of a resulting salt may be converted directly into another anion according to known methods. Thus, an iodide salt, when reacted with freshly prepared silver chloride or with hydrogen chloride in anhydrous methanol, yields the corresponding chloride salt. Furthermore, the anion, for example, a halide, such as the iodide, ion may be exchanged for another anion, for example, another halide, such as the chloride, ion by treatment with a suitable anion exchange preparation, such as, for example, with Amberlite IRA 400 (as described in U.S. Patent No. 2,591,573).

As noted before, intermediates and starting materials formed in the previously mentioned procedure are converted into derivatives thereof, such as salts, N-oxides, salts of N-oxides, quaternary compounds and the like; these derivatives are prepared according to known methods.

Thus, an acid addition salt may be converted into the free compound, for example, by reacting it with a basic reagent, such as a metal hydroxide, e.g. sodium hydroxide, potassium hydroxide, calcium hydroxide and the like, a metal carbonate, e.g. sodium, potassium or calcium carbonate or hydrogen carbonate and the like, ammonia, or any other suitable basic reagent, or with a hydroxyl anion exchange preparation.

An acid addition salt may be converted into another acid addition salt; for example, an addition salt with an inorganic acid may be reacted with a metal salt, e.g. sodium, barium silver and the like, salt of an acid in a suitable diluent, in which a resulting inorganic compound is insoluble and is thus removed from the reaction medium 'he conversion of one acid addition salt into another may lso be achieved by treatment with a suitable anion ex-hange preparation.

N-oxides are formed, for example, by reacting a com-ound or a salt thereof (which may also be formed in itu), preferably a solution of such compound in an inert olvent, with an N-oxidizing reagent, such as, for ex-mple, hydrogen peroxide, ozone, persulfuric acid, or ıore especially, an organic peracid, such as an organic ercarboxylic acid, e.g. peracetic, perbenzoic, monoper-hthalic acid and the like, or a persulfonic acid, e.g. p-›luene persulfonic acid and the like. In the N-oxidation eaction, an excess of the oxidation reagent and/or an ıcrease in temperature should be avoided in order to pre-ent oxidative degradation.

A resulting N-oxide is converted into its acid addition ılt by treatment with a suitable acid according to the pre-iously described procedure.

An N-oxide may also be converted into the free com-ound according to known reduction procedures, for ex-mple, by treatment with hydrogen in the presence of a ıtalyst containing a metal of Group VIII of the Periodic ystem, such as one of those previously described, with ascent hydrogen, as generated, for example, by heavy ıetals, e.g. iron, zinc, tin and the like, in the presence f acids, e.g. acetic acid and the like, or any other appro-riate reducing reagent or method.

Lower alkyl quaternary ammonium compounds of 2-R- - $R_1°$ - 4-$R_2$-1,2,3,4-tetrahydro-1,4-ethano-isoquinoline ›mpounds, in which R, $R_2$ and $R_1°$ have the previously ven meaning, the latter being an organic ylidene radical ıving aliphatic characteristics, are especially those with ·active esters of sterically non-hindered lower alkanols, ;pecially primary lower alkanols. Particularly useful are ıbranched lower alkyl halides, e.g. methyl, ethyl or n-pro-/l chloride, bromide or iodide and the like, di-un-·anched lower alkyl-sulfates, e.g. dimethyl sulfate, di-hyl sulfate and the like, unbranched lower alkyl organic .lfonates, e.g. methyl or ethyl methane sulfonate, 2-hy-·oxy-ethane sulfonate or p-toluene sulfonate and the like. he quaternizing reaction is carried out in the absence or 'esence of a solvent or solvent mixture, while cooling or an elevated temperature, in a closed vessel, and/or in e atmosphere of an inert gas.

Mixtures of isomeric compounds are separated into sin-e isomers. Thus, a mixture of racemates may be sepa-ted into individual racemic compounds according to ıown methods, based, for example, on physico-chemical fferences, such as different solubilities, different boiling ›ints and the like. Thus, they may be separated by frac-›nal crystallization, fractional distillation and the like. Racemates are resolved, for example, into the optically tive forms, the levo-rotatory l-form and the dextro-ro-tory d-form; such resolutions are carried out according known methods. For example, to a solution of the free .se of a racemate (a d, l-compound) in a suitable sol-nt or solvent mixture is added one of the optically tive forms of an acid, containing an asymmetric carbon om, or a solution thereof. Especially useful as optically tive forms of salt-forming acids, having an asymmetric rbon atom are the d-tartaric acid (L-tartaric acid) and e l-tartaric acid (D-tartaric acid); the optically active rms of dibenzoyl-tartaric, di-p-toluyl-tartaric, malic, andelic, 10-camphor sulfonic acid, quinic acid and the :e, may also be used. Salts formed by the optically ac-'e forms of the base with the optically active form of e acid may then be separated and isolated, primarily : the basis of their different solubilities. The free and tically active base may be obtained from a resulting lt according to the methods outlined hereinbefore, and, desired, converted into an acid addition salt, an N-oxide, acid addition salt of an N-oxide, or a quaternary mpound as shown above.

The above starting materials and intermediates, when-er present in the form of mixtures of isomeric com-pounds, may be separated into the single isomers accord-ing to known separation methods.

The invention also comprises any modification of the process wherein a compound obtainable as an intermedi-ate at any stage of the process is used as starting mate-rial and the remaining step(s) of the process is(are) carried out. It also includes any new intermediates, which may be formed in one of the procedures outlined herein-before.

In the process of this invention such starting materials are preferably used which lead to final products men-tioned in the beginning as embodiments of the invention.

This is a continuation-in-part application of my appli-cation Ser. No. 314,517, filed Oct. 7, 1963.

The following examples are intended to illustrate the invention and are not to be construed as being limitations thereon. Temperatures are given in degrees centigrade.

*Example 1*

A mixture of 7.5 g. of 3-methyl-4-phenyl-1,4-dihydro-1,4-ethano-isoquinoline and 25 ml. of methyl iodide in 150 ml. of methanol is refluxed for 5½ hours. The major portion of the solvent is evaporated, whereupon a crys-talline product is formed which is filtered off and washed with methanol to yield 9.25 g. of the 2,3-dimethyl-4-phenyl-1,4-dihydro-1,4-ethano-isoquinolinium iodide of the formula

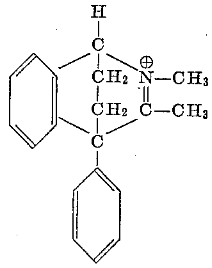

I⊖ which melts at 242–244° (with decomposition) after re-crystallization from methanol and contains one mole of water. It analyzes as follows:

Calcd. for $C_{19}H_{20}NI \cdot H_2O$: C, 56,02; H, 5.45; N, 3.42; I, 31.16. Found: C, 55.65; H, 5.35; N, 3.14; I, 32.32.

The infrared absorption spectrum (taken in mineral oil) shows the presence of water and a strong peak at 6.03$\mu$.

Another sample, melting at 233–234° (with decomposi-tion), obtained by recrystallizing the resulting 2,3-dimeth-yl - 4-phenyl-1,4-dihydro-1,4-ethano-isoquinolinium iodide from a mixture of methanol and diethyl ether, does no longer show the broad hydroxyl band in the infrared ab-sorption spectrum. It analyzes as follows:

Calcd. for $C_{19}H_{20}NI$: C, 58.62; H, 5.18; N, 3.60. Found: C, 57.58; H, 5.39; N, 4.15; and represents the anhydrous 2,3 - dimethyl - 4-phenyl-1,4-dihydro-1,4-ethano-isoquino-linium iodide.

The starting material used in the above procedure is prepared as follows: A solution of 105.0 g. of 1,1-diphen-ylacetone in 300 ml. of tetrahydrofuran is treated with 15 ml. of a 40 percent solution of benzyl trimethylam-monium methoxide in methanol. A total of 26.5 g. of acrylonitrile in 100 ml. of tetrahydrofuran is added slowly over a period of about twenty minutes while keep-ing the temperature at 25–30° by external cooling with an ice-bath. After completing the addition, the reaction mixture is allowed to stand at room temperature for 1½ hours; it is then chilled in an ice-bath, acidified with dilute hydrochloric acid and poured into a mixture of ice and water. A semi-solid material separates which is filtered off, washed with water, and pressed free from the oily material. The crude solid material is triturated with diethyl ether to yield 60.5 g. of 4-acetyl-4,4-diphenyl-butyronitrile, which is purified by recrystallization from ethanol or methanol, M.P. 117–118°.

A mixture of 130.0 g. of 4-acetyl-4,4-diphenyl-butyronitrile, 800 ml. of glacial acetic acid and 800 ml. of concentrated hydrochloric acid is refluxed for 4½ hours. A portion of the solvent is distilled off under reduced pressure until a crystalline material precipitates. The remaining mixture is cooled, and then poured into 3000 ml. of ice-water; the resulting crystalline material is collected, washed with several portions of water and air-dried. A quantitative yield of the 4-acetyl-4,4-diphenyl-butyric acid is obtained; the desired product melts at 140.5–142.5° after recrystallization from ethanol.

A total of 95.0 g. of 4-acetyl-4,4-diphenyl-butyric acid is added in small portions to 800 ml. of concentrated sulfuric acid while stirring. The addition is completed after 1½ hours; occasional external cooling is necessary to prevent the temperature rise above 30–40°. The deep-red solution is stirred at room temperature for another four to five hours and is then poured onto about 4000 g. of chopped ice. The organic material is extracted with diethyl ether, the organic extract is washed with water, a dilute sodium hydroxide solution in water and again with several portions of water, dried over magnesium sulfate and evaporated to a small volume. The crystalline 4-acetyl-4-phenyl-1,2,3,4-tetrahydro-naphthalen-1-one of the formula

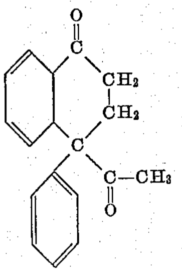

is filtered off (yield: 44 g.) and recrystallized from diethyl ether, M.P. 106–108°. It analyzes as follows:

Calcd. for $C_{18}H_{16}O_2$: C, 81.79; H, 6.10. Found: C, 81.89; H, 6.23.

Its infrared absorption spectrum (taken in mineral oil) shows peaks at 5.85μ and 5.96μ, and its ultraviolet absorption spectrum (taken in ethanol) shows $\lambda_{max.}$ at 249 mμ (ε=11,190) and 293 mμ (ε=2,010). It forms a mono-2,4-dinitro-phenylhydrazone when treated with 2,4-dinitro-phenylhydrazine; the 4-acetyl-1-(2,4-dinitro-phenylhydrazono)-4-phenyl-1,2,3,4-tetrahydro-napthalene melts at 201.5–203.5° and analyzes as follows:

Calcd. for $C_{24}H_{20}O_5N_4$: C, 64.86; H, 4.54; N, 12.61. Found: C, 64.68; H, 4.54; N, 12.77.

A solution of 2.0 g. of 4-acetyl-4-phenyl-1,2,3,4-tetrahydro-naphthalen-1-one and 5.0 g. of hydroxylamine hydrochloride in 20 ml. of water, 40 ml. of ethanol and 10 ml. of a 20 percent aqueous solution of sodium hydroxide is refluxed for ten minutes, and is then chilled in an ice bath. A small amount of ice is added; a crystalline material separates, and is collected, washed with water and recrystallized from ethanol to yield the 4-acetyl-1-hydroxy-imino-4-phenyl-1,2,3,4-tetrahydro-napthalene of the formula

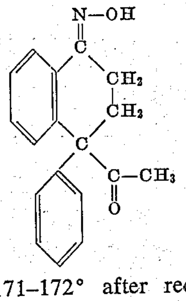

which melts at 171–172° after recrystallization from ethanol; yield: 1.2 g. It analyzes as follows:

Calcd. for $C_{18}H_{17}O_2N$: C, 77.39; H, 6.13; N, 5.01. Found: C, 77.13; H, 6.11; N, 5.04.

Its infrared absorption spectrum (taken in mineral oil) shows peaks at 3.00μ, 5.89μ and 6.15μ, and its ultraviolet absorption spectrum (taken in ethanol) shows $\lambda_{max.}$ 257 mμ (ε=12,590).

A solution of 2.8 g. of 4-acetyl-1-hydroxyimino-4-phenyl-1,2,3,4-tetrahydro-naphthalene in 300 ml. of ethanol is treated with hydrogen under a pressure of about 3½ atmospheres pressure and in the presence of 1.0 g. of a palladium catalyst (10 percent palladium on charcoal) while heating to 60° and shaking. After three hours, the pressure has dropped about 0.1 atmosphere and the hydrogenation reaction is interrupted. The reaction mixture is filtered, the filtrate is evaporated, and the residue is triturated with diethyl ether to yield 1.0 g. of the crystalline 3-methyl-4-phenyl-1,4-dihydro-1,4-ethano-isoquinoline of the formula

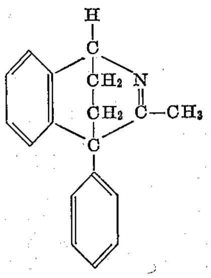

which is recrystallized from a mixture of ethanol and diethyl ether, and melts at 135–136° after drying under reduced pressure. The compound analyzes as follows:

Calcd. for $C_{18}H_{17}N$: C, 87.41; H, 6.93; N, 5.66. Found: C, 87.54; H, 7.28; N, 5.56.

The infrared spectrum of the above compound (taken in mineral oil) shows a sharp, strong peak at 6.11–6.13μ, indicating a —C=N— grouping, whereas the ultraviolet spectrum (taken in ethanol) shows no conjugation: $\lambda_{max.}$ at 258 mμ (ε=620) and 264 mμ (ε=470).

The above starting material is also prepared as follows: A mixture of 14.2 g. of 4-acetyl-4-phenyl-1,2,3,4-tetrahydro-naphthalen-1-one and 33.0 g. of hydroxylamine hydrochloride in the presence of 200 ml. of ethanol, 135 ml. of water and 65 ml. of a 20 percent aqueous solution of sodium hydroxide is refluxed for 2½ hours. Upon cooling, a crystalline precipitate is formed which is filtered off, washed with water and air-dried to yield 12.4 g. of the 4-acetyl-4-phenyl-1,2,3,4-tetrahydro-naphthalen-1-one dioxime of the formula

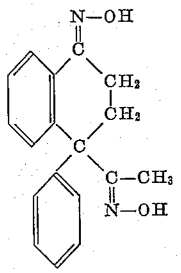

which melts at 221–222° after recrystallization from ethanol. It analyzes as follows:

Calcd. for $C_{18}H_{18}O_2N_2$: C, 73.45; H, 6.16; N, 9.52 Found: C, 73.73; H, 6.17; N, 9.28.

The infrared absorption spectrum (taken in mineral oil) lacks the carbonyl absorption peaks and shows only broad bands and a band at 6.08μ; its ultraviolet absorption spectrum (taken in ethanol) has a $\lambda_{max.}$ at 256 mμ (ε=12,910).

The above 4-acetyl-4-phenyl-1,2,3,4-tetrahydro-naphthalen-1-one dioxime is also obtained from the procedure for the preparation of the 4-acetyl-1-hydroxyimino-4-phenyl-1,2,3,4-tetrahydro-naphthalene as previously described; from a ten-fold scaled-up procedure, 16.3 g. of the 4-acetyl-1-hydroxyimino-4-phenyl-1,2,3,4-tetrahydro-naphthalene is obtained, M.P. 163–167°, whereas from the recrystallization mother liquors, 2.3 g. of the 4-acetyl-4-phenyl-1,2,3,4-tetrahydro-naphthalen-1-one dioxime is obtained, which melts at 221–222° after recrystallization from ethanol.

A solution of 25.7 g. of 4-acetyl-4-phenyl-1,2,3,4-tetrahydro-naphthalen-1-one dioxime in 300 ml. of ethanol is treated with hydrogen under a pressure of about 3½ atmospheres and in the presence of 8.0 g. of a palladium catalyst (10 percent palladium-on-charcoal) while shaking and heating to 60°. The uptake of about two molar equivalents of hydrogen is complete within about six hours; however, the reaction is allowed to proceed for an additional ten hours, and an additional quantity of hydrogen is absorbed, primarily for the conversion of any generated hydroxylamine into ammonia and water (after opening the hydrogenation vessel, the odor of ammonia becomes apparent). The catalyst is filtered off, the filtrate is evaporated and the residue is recrystallized from diethyl ether to yield 7.5 g. of 3-methyl-4-phenyl-1,4-dihydro-1,4-ethano-isoquinoline, M.P. 131–134°, which is identical with the product obtained according to the previously described procedure (undepressed mixed melting point, and identical infrared absorption spectrum).

A mixture of 3-methyl-4-phenyl-1,4-dihydro-1,4-ethano-isoquinoline and an ethanol solution of hydrogen chloride, when diluted with diethyl ether yields the 3-methyl-4-phenyl-1,4-dihydro-1,4-ethano-isoquinoline hydrochloride, which melts at 223–225° after recrystallization from a mixture of ethanol and diethyl ether. It analyzes as follows:

Calcd. for $C_{18}H_{18}NCl$: C, 76.18; H, 6.39; N, 4.93. Found: C, 76.23; H, 6.50; N, 4.97.

A saturated ethanol solution of picric acid is added to an ethanol solution of 3-methyl-4-phenyl-1,4-dihydro-1,4-ethano-isoquinoline. The resulting 3-methyl-4-phenyl-1,4-dihydro-1,4-ethano-isoquinoline picrate is recrystallized from ethanol, M.P. 211.5–213.5° (with decomposition), and analyzes as follows:

Calcd. for $C_{24}H_{20}O_7N_4$: C, 60.50; H, 4.23; N, 11.76. Found. C, 60.32; H, 4.30; N, 11.58.

*Example 2*

To a solution of 1.5 g. of 2,3-dimethyl-4-phenyl-1,4-dihydro-1,4-ethano-isoquinolinium iodide in 250 ml. of methanol is added silver chloride, freshly prepared from 1.0 g. of silver nitrate by precipitation with sodium chloride. The reaction mixture is refluxed and stirred for 4½ hours and is then filtered hot. The filtrate is evaporated, and the residue is recrystallized from a mixture of methanol and diethyl ether to yield 1.2 g. of 2,3-dimethyl-4-phenyl-1,4-dihydro-1,4-ethano-isoquinolinium chloride of the formula

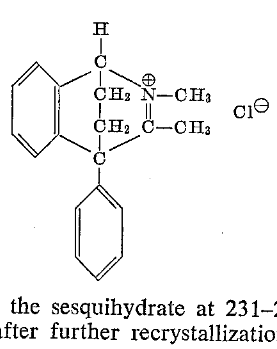

which melts at the sesquihydrate at 231–232° (with decomposition) after further recrystallizations from methanol.

*Example 3*

A solution of 3.3 g. of 2,3-dimethyl-4-phenyl-1,4-dihydro-1,4-ethano-isoquinolinium iodide hydrate in warm ethanol is treated with an excess of a 10 percent aqueous solution of sodium hydroxide, followed by about 500 ml. of diethyl ether. After vigorous shaking, the layers are separated; the organic solution is washed several times with water, dried over potassium carbonate, and evaporated to yield 2.1 g. of a residue, which upon trituration with diethyl ether crystallizes to the 2-methyl-3-methylene-4-phenyl-1,2,3,4-tetrahydro-1,4-ethano-isoquinoline of the formula

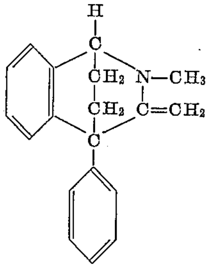

A colorless sample of the base, obtained by recrystallizations from diethyl ether, melts at 170–173° and analyzes as follows:

Calcd. for $C_{19}H_{19}N$: C, 87.31; H, 7.33; N, 5.36. Found: C, 87.37; H, 7.38; N, 5.23.

A total of 24.8 g. of 2-methyl-3-methylene-4-phenyl-1,2,3,4-tetrahydro-1,4-ethano-isoquinoline in 400 ml. of benzene and 100 ml. of dry diethyl ether is treated dropwise with a sufficient amount of an about 5 percent solution of hydrogen chloride in ethanol to cause complete precipitation of the 2,3-dimethyl-4-phenyl-1,4-dihydro-1,4-ethano-isoquinolinium chloride. The crystalline material is filtered off, washed with dry diethyl ether and dried at room temperature under reduced pressure, yield: 28.7 g.; it melts as the monohydrate at 242–244° (with decomposition) and analyzes as follows:

Calcd. for $C_{19}H_{20}NCl \cdot H_2O$: C, 72.25; H, 7.02; N, 4.44. Found: C, 71.72; H, 6.99; N, 4.53.

*Example 4*

A mixture of 1.0 g. of 3-methyl-4-phenyl-1,4-dihydro-1,4-ethano-isoquinoline and 15 ml. of ethyl iodide in 100 ml. of ethanol is refluxed for seven hours. Upon evaporating the solvent and crystallizing the residue from diethyl ether and acetone, 0.7 g. of the 2-ethyl-3-methyl-4-phenyl-1,4-dihydro-1,4-ethano-isoquinolinium iodide of the formula

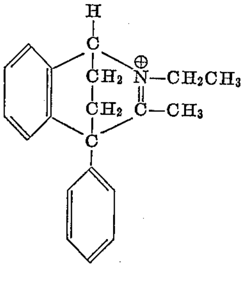

is obtained, which melts at 207–209° (with decomposition) and analyzes as follows:

Calcd. for $C_{20}H_{22}NI$: C, 59.56; H, 5.50; N, 3.47. Found: C, 59.26; H, 5.77; N, 3.26.

Its infrared spectrum (taken in mineral oil) shows the strong peak for the —C=N— bond at 6.06$\mu$, and some hydration.

*Example 5*

A mixture of 1.0 g. of 3-methyl-4-phenyl-1,4-dihydro-1,4-ethano-isoquinoline and 15 ml. of n-butyl iodide and 100 ml. of ethanol is refluxed for 3½ hours and is then evaporated. The residue, when crystallized from diethyl ether and acetone, yields 1:3 g. of the 2-n-butyl-3-methyl- 4-phenyl-1,4-dihydro-1,4-ethano-isoquinolinium iodide of the formula

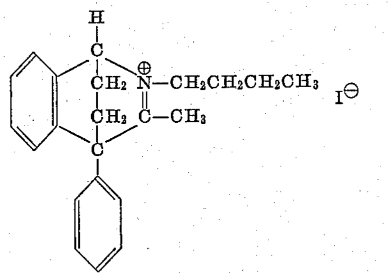

which melts at 210–212° (with decomposition) after recrystallization from acetone, and analyzes as follows:

Calcd. for $C_{22}H_{26}NI$: C, 61.25; H, 6.08; N, 3.25. Found: C, 60.97; H, 6.08; N, 3.10.

Its infrared absorption spectrum (taken in mineral oil) shows a sharp and strong peak at 6.05μ.

*Example 6*

A mixture of 1.0 g. of 3-methyl-4-phenyl-1,4-dihydro-1,4-ethano-isoquinoline and 15 ml. of benzyl chloride in 100 ml. of benzene is refluxed for five hours, and is then evaporated. The residue is treated with diethyl ether to yield 1.0 g. of 2-benzyl-3-methyl-4-phenyl-1,4-dihydro-1,4-ethano-isoquinolinium chloride of the formula

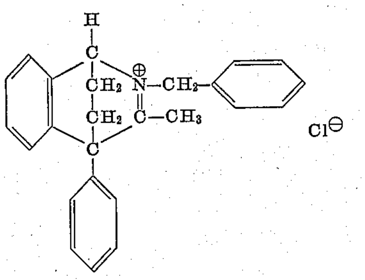

which melts as the hemihydrate at 231–233° after recrystallization from a mixture of methanol, acetone and diethyl ether. It analyzes as follows:

Calcd. for $C_{25}H_{24}NCl \cdot \frac{1}{2}H_2O$: C, 78.41; H, 6.58; N, 3.66. Found: C, 77.87; H, 6.56; N, 3.70; and its infrared spectrum (taken in mineral oil) has a strong peak at 6.09μ.

*Example 7*

A mixture of 2.0 g. of 3-methyl-4-phenyl-1,4-dihydro-1,4-ethano-isoquinoline and 15 ml. of 2-phenylethyl iodide in 50 ml. of toluene is refluxed for 3½ hours and is then evaporated under reduced pressure. The residue is crystallized from a mixture of acetone, methanol and diethyl ether to yield 2.4 g. of the 3-methyl-4-phenyl-2-(2-phenylethyl)-1,4-dihydro-1,4-ethano-isoquinolinium iodide of the formula

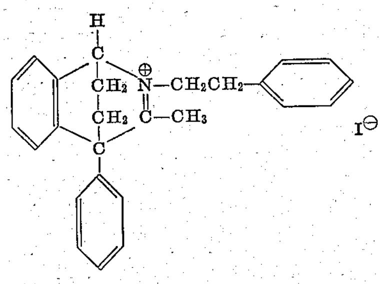

which melts at 215.5–216.5° (with decomposition) after further recrystallization from the above solvent mixture, and analyzes as follows:

Calcd. for $C_{26}H_{26}NI$: C, 65.13; H, 5.47; N, 2.92. Found: D, 64.97; H, 5.55; N, 2.82.

Its infrared spectrum (taken in mineral oil) shows a sharp peak at 6.08μ.

*Example 8*

A mixture of 1.0 g. of 3-methyl-4-phenyl-1,4-dihydro-1,4-ethano-isoquinoline and 15 ml. of allyl iodide in 50 ml. of benzene is refluxed for fifteen minutes and is then evaporated to yield a residue, which crystallizes from a mixture of methanol, acetone and diethyl ether, yield: 1.0 g. The resulting 2-allyl-3-methyl-4-phenyl-1,4-dihydro-1,4-ethano-isoquinolinium iodide of the formula

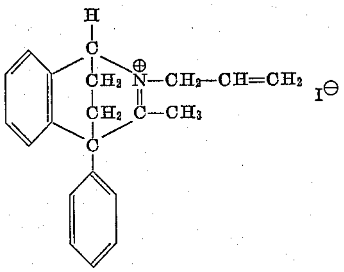

melts at 208–210° (with decomposition) after recrystallization from the same solvent mixture; it analyzes as follows:

Calcd. for $C_{21}H_{22}NI$: C, 60.73; H, 5.34; N, 3.37. Found: C, 60.58; H, 5.40; N, 3.31; and its infrared absorption spectrum (taken in mineral oil) shows a peak at 6.16μ, indicating that the allyl-double bond influences the —C=N— double bond stretching.

*Example 9*

A solution of the crude 2-methyl-3-methylene-4-phenyl-1,2,3,4-tetrahydro-1,4-ethano-isoquinoline (prepared according to the procedure described below) in diethyl ether is treated with a solution of hydrogen chloride in ethanol as described in Example 3 to yield the 2,3-dimethyl-4-phenyl-1,4-dihydro-1,4 - ethano - isoquinolinium chloride, which melts at 239–241° (with decomposition) after recrystallization from a mixture of ethanol and diethyl ether; a mixed sample with the 2,3-dimethyl-4-phenyl-1,4-dihydro-1,4-ethano-isoquinolinium chloride sesquihydrate of Example 2 melts at 239–241° (with decomposition), and the infrared absorption spectra of the two compounds are identical.

The starting material used in the above procedure is prepared as follows: To a mixture of 193.0 g. of diphenylacetonitrile and 30 ml. of a 40 percent solution of benzyl-trimethyl-ammonium methoxide in methanol, in 400 ml. of tetrahydrofuran is added 53.0 g. of acrylonitrile in 100 ml. of tetrahydrofuran over a period of 15 minutes; during the addition the temperature is maintained at 20° or below by cooling with an ice-bath. The reaction mixture is allowed to stand for 1½ hours, and is then treated with a mixture of ice and hydrochloric acid, and water. The organic material is extracted with diethyl ether; the organic solution is washed with a dilute aqueous solution of sodium hydroxide and water, dried over magnesium sulfate and concentrated to a volume of about 250 ml. Upon cooling to 0°, a total of 130.0 g. of the crystalline α,α-diphenyl-glutaronitrile precipitates; a sample, recrystallized from diethyl ether, melts at 73–74.5 g.

A mixture of 98.0 g. of α,α-diphenyl-glutaronitrile and a solution of 545.0 g. of potassium hydroxide, in 660 ml. of water is refluxed at 100–110° for four days while stirring occasionally. The cold solution is then acidified, and the resulting α,α-diphenyl-glutaric acid is filtered off, washed with water and air-dried, yield: 91.5 g. A sample recrystallized from ethyl acetate, melts at 199–200.5°.

The above α,α-diphenyl-glutaric acid is also obtained as follows: A solution of 250.0 g. of diphenylacetonitrile in 1000 ml. of tetrahydrofuran is treated with 40 ml. of benzyl-trimethylammonium hydroxide, and then with 72.0 g. of methyl acrylate. After the exothermic reaction subsides, the reaction mixture is allowed to stand for 2½ days; ice and hydrochloric acid is added, the aqueous mixture is diluted with water and the organic material is exracted with diethyl ether. The organic solution is worked ıp as shown above to yield the oily ethyl γ-cyano-γ,γ-di- phenyl-butyrate, which is refluxed for nine hours with 000 ml. of a 30 percent aqueous solution of potassium ıydroxide. Heating on the steam bath is continued for hree additional days; the cold solution is then acidified vith hydrochloric acid to yield 127.0 g. of the α,α-diphen- l-glutaric acid, which is collected, washed with water and ir-dried; a sample melts at 190° after recrystallization rom diethyl ether.

The α,α-diphenyl-glutaric acid is also obtained as fol- ows: The sodium methoxide, obtained from 1.0 g. of so- lium and methanol, is suspended in 100 ml. of tetrahy- lrofuran; after adding 11.6 g. of ethyl diphenylacetate nd 2.7 g. of acrylontrile, the reaction mixture is warmed t 65° for one hour. The major portion of the solvent s evaporated, and the cooled residue is diluted with water. 'he organic material is extracted with diethyl ether; the rganic solution is washed with water, dried and evap- rated to yield 4.0 g. of the desired γ-carbethoxy-γ,γdi- henyl-butyronitrile, which crystallizes from diethyl ether nd melts in the range of 98–112°. It is hydrolyzed by re- uxing for four hours a mixture of 3.6 g. of the product nd 20.0 ml. of a 20 percent aqueous solution of potas- um hydroxide containing sufficient ethanol to ensure a omplete solution, and acidifying the reaction mixture ith hydrochloric acid. The desired α,α-diphenyl-glutaric cid melts at 195–199°; yield: 3.5 g.

A total of 95.0 g. of the dry α,α-diphenyl-glutaric acid stirred into 1800 ml. of concentrated sulfuric acid over period of ten minutes; a deep red solution is obtained fter two hours of stirring, which is allowed to stand over- ight and is then poured over ice. The organic material is tracted with diethyl ether; the organic solution is washed ith water, dried over magnesium sulfate, filtered and aporated. The residue crystallizes from a concentrated olution in diethyl ether to yield several crops of 4-phenyl- 2,3,4-tetrahydro-naphthalen-1-one 4-carboxylic acid of e formula

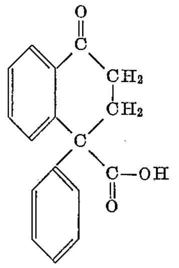

hich melts at 161.5–163° after recrystallization from di- hyl ether, and analyzes as follows:

Calcd. for $C_{17}H_{14}O_3$: C, 76.67; H, 5.30. Found: C, .05; H, 5.34.

Its infrared absorption spectrum (taken in mineral oil) ows a strong unresolved double peak at 5.90μ, and its traviolet absorption spectrum (taken in ethanol) has a ıax. at 249μ

$$(\epsilon^{1\%}_{1\,cm.}\ 431.5)$$

The above 4-phenyl-1,2,3,4-tetrahydro-naphthalen-1- ıe 4-carboxylic acid is also obtained as follows: A mix- re of 61.5 g. of α,α-diphenyl-glutaronitrile and about 00 ml. of a 1:1-mixture of concentrated hydrochloric id and glacial acetic acid is refluxed for four hours, and then poured into water. The crystalline α,α-diphenyl- ıtarimide is filtered off and air-dried, yield: 70.0 g.; a mple recrystallized from ethyl acetate melts at 162.5– 5°.

A mixture of 76.2 g. of α,α-diphenyl-glutarimide in 750 ml. of a 5 percent aqueous solution of sodium hydroxide is boiled for five minutes until a complete solution is obtained. The latter is then cooled, filtered and acidified with dilute hydrochloric acid to yield the γ-carbamyl-γ,γ-diphenyl-butyric acid, which is filtered off, washed with water and air-dried, yield: 92.8 g. It melts at 155–158° after recrystallization from ethyl acetate.

To 450 ml. of concentrated sulfuric acid is added while stirring 48.0 g. of γ-carbamyl-γ,γ-diphenyl-butyric acid; stirring is continued until a deep green solution is obtained, which is allowed to stand overnight at room temperature and is then poured onto ice. The organic material is extracted with diethyl ether; the organic solution is washed free of acidic products with a 5 percent aqueous solution of sodium hydroxide and water and is then dried over magnesium sulfate and evaporated. Starting material recovered from the basic washings by acidification is recycled, and a total of 22.4 g. of 4-phenyl-1,2,3,4-tetrahydro-naphthalen-1-one 4-carboxylic amide of the formula

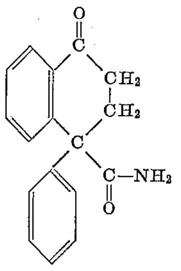

is recovered which melts at 192–193° after recrystallization from ethyl acetate. It analyzes as follows:

Calcd. for $C_{17}H_{15}O_2N$: C, 76.96; H, 5.70; N, 5.28. Found: C, 77.07; H, 5.54; N, 5.15.

Its infrared absorption spectrum (taken in mineral oil) has characteristic absorptions at 5.97μ and 6.05μ, and the ultraviolet absorption spectrum (taken in ethanol): $\lambda_{max.}$ at 249 mμ (ε=11,040) and 290–294 mμ (ε=2,020).

A mixture of 5.0 g. of 4-phenyl-1,2,3,4-tetrahydro-naphthalen-1-one 4-carboxylic amide and 100 ml. of concentrated hydrochloric acid in 50 ml. of glacial acetic acid is refluxed for four hours, and is then poured onto ice. The organic material is extracted with diethyl ether, and the organic solution is washed with an aqueous solution of sodium hydrogen carbonate. A total of 2.0 g. of the 4-phenyl-1,2,3,4-tetrahydro-naphthalen-1-one 4-carboxylic acid is recovered from the aqueous solution by acidification with a 1:1-mixture of concentrated hydrochloric acid and water and extraction of the organic material with diethyl ether. The product is identical with the compound obtained according to the previously described procedure, and is identified as the 2,4-dinitro-phenyl-hydrazone by treating an ethanol solution of 4-phenyl-1,2,3,4-tetrahydro-naphthalen-1-one 4-carboxylic acid with an aqueous ethanol-sulfuric acid solution of 2,4-dinitro-phenylhydrazine; the derivative melts at 266–267° (with decomposition) after several recrystallizations from ethyl acetate.

To 50.0 g. of 4-phenyl-1,2,3,4-tetrahydro-naphthalen-1-one 4-carboxylic acid is added a solution of 140 ml. of concentrated sulfuric acid and 10 ml. of fuming sulfuric acid (containing 30 percent sulfur trioxide) in 3000 ml. of absolute ethanol. The solution is refluxed for 18 hours; the organic solvent is distilled off, the residue is cooled and treated with ice, and the organic material is extracted with diethyl ether. The organic solution is washed with water, then with adilute aqueous solution of sodium hydroxide (acidification of which yields 21.0 g. of recovered 4-phenyl-1,2,3,4-tetrahydro-naphthalen-1-one 4-carboxylic acid, which is recycled), and again with water, dried over magnesium sulfate, filtered and evaporated. A total of 20.7 g of ethyl 4-phenyl-1,2,3,4-tetrahydro-naphthalen-1-one 4-carboxylate of the formula

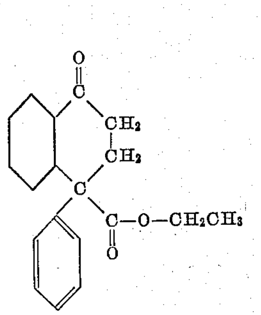

is obtained, which melts at 89.5–91° after recrystalilzation from diethyl ether, and analyzes as follows:

Calcd. for $C_{19}H_{18}O_3$: C, 77.53; H, 6.16. Found: C, 77.50; H, 6.34.

Its infrared absorption spectrum (taken in mineral oil) shows peaks at 5.78$\mu$ and 5.92$\mu$, and its ultraviolet absorption spectrum (taken in ethanol) shows $\lambda_{max.}$ at 248 m$\mu$ ($\epsilon$=11,930) and at 290–294 m$\mu$ ($\epsilon$=2,040).

A solution of 19.0 g. of ethyl 4-phenyl-1,2,3,4-tetrahydro-naphthalen-1-one 4-carboxylate in 300 ml. of ethanol is treated with a solution of hydroxylamine, prepared from 48.0 g. of hydroxylamine hydrochloride and 19.0 g. of sodium hydroxide in 285 ml. of water while cooling. The reaction mixture is refluxed for ten minutes and is then cooled; the organic material is extracted with diethyl ether, and the organic solution is washed with water, dried over magnesium sulfate and evaporated. The resulting ethyl 1-hydroxyimino-4-phenyl-1,2,3,4-tetrahydro-naphthalene 4-carboxylate of the formula

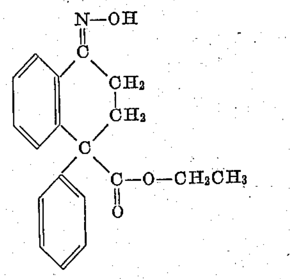

crystallizes from a mixture of ethanol and water (yield: 19.0 g.) and is recrystallized from ethanol, M.P. 136–138°. It analyzes as follows:

Calcd. for $C_{19}H_{19}O_3N$: C, 73.76; H, 6.19; N, 4.53. Found: C, 73.73; H, 5.96; N, 4.70.

Its infrared absorption spectrum (taken in mineral oil) shows a broad band at 3.07–3.09$\mu$ and a sharp band at 5.76$\mu$; its ultraviolet absorption spectrum (taken in ethanol) shows $\lambda_{max.}$ at 220 m$\mu$ (shoulder; $\epsilon$=22,470), at 256 m$\mu$ ($\epsilon$=13,410) and at 298 m$\mu$ (shoulder; $\epsilon$=640).

A mixture of 24.4 g. of ethyl 1-hydroxyimino-4-phenyl-1,2,3,4-tetrahydro-naphthalene 4-carboxylate and about 15 g. of Raney nickel in 200 ml. of ethanol is shaken in a hydrogen atmosphere under an initial pressure of about 3½ atmospheres, first as room temperature, and after one hours at 60°. After the uptake of 2.06 molar equivalents of hydrogen, the reduction is interrupted, the catalyst is filtered off, and the filtrate is evaporated to yield a clear oil having basic properties and representing a mixture of the cis- and the trans-isomer of ethyl 1-amino-4-phenyl-1,2,3,4 - tetrahydro-naphthalene 4-carboxylate of the formula

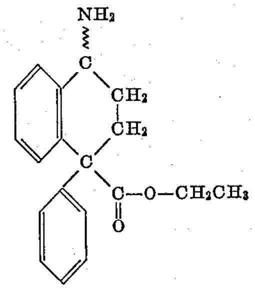

A readily water-soluble hydrochloride, which is prepared by treating the resulting mixture of the basic ester with ethanolic hydrogen chloride, evaporating the solvent and triturating the residue with diethyl ether, melts at 187–189° (with decomposition) after recrystallization from a a mixture of methanol and diethyl ether. It analyzes as follows:

Calcd. for $C_{19}H_{21}NO_2 \cdot HCl$: C, 68.77; H, 6.68; N, 4.22. Found: C, 68.32; H, 6.65; N, 4.13; and its infrared absorption spectrum (taken in mineral oil) has a characteristic absorption at 5.81$\mu$.

Upon standing at room temperature, the above crude mixture of cis- and trans-ethyl 1-amino-4-phenyl-1-,2,3,4-tetrahydronaphthalene 4-carboxylate deposits crystals; the resulting mixture is triturated with diethyl ether, and the crystalline 4-phenyl - 1,2,3,4-tetrahydro-1,4-ethano-isoquinoline-3-one of the formula

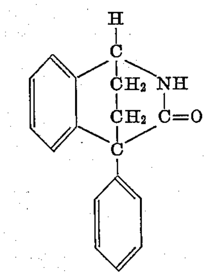

is filtered off; it melts at 267.5–269° after recrystallization from methanol. A total of 23.3 g. of the crude mixture yields 4.5 g. of the desired lactam after standing over a period of one month.

The above 4-phenyl-1,2,3,4-tetrahydro-1,4-ethano-isoquinolin-3-one is also obtained by heating 29.0 g. of the above crude mixture of cis- and trans-ethyl 1-amino-4-phenyl-1,2,3,4-tetrahydro-naphthalene 4-carboxylate on the steam bath for a total of five days. Each day, the resulting 4-phenyl-1,2,3,4 - tetrahydro - 1,4 - ethano-isoquinolin-3-one is removed using diethyl ether as shown above, and a total of 10.8 g. of the desired product is obtained. A sample melting at 268–270° analyzes as follows:

Calcd. for $C_{17}H_{15}ON$: C, 81.90; H, 6.06; N, 5.62. Found: C, 82.3; H, 6.18; N, 5.62; and its infrared absorption spectrum (taken in mineral oil) shows a characteristic band at 5.97$\mu$.

The non-cyclized residual material is treated with ethanolic hydrogen chloride and diethyl ether; the not readily water soluble salt represents the trans-ethyl 1-amino-4-phenyl-1,2,3,4-tetrahydro - naphthalene 4-carboxylate hydrochloride, which melts at 246–248° (with decomposition) after recrystallization from diethyl ether. It analyzes as follows:

Calcd. for $C_{19}H_{21}O_2N \cdot HCl$: C, 68.77; H, 6.68; N, 4.22. Found: C, 68.38; H, 6.68; N, 4.22; and its infrared absorption spectrum (taken in mineral oil) shows a characteristic peak at 5.77$\mu$ and is not identical with the previously described salt, which represents the cis-ethyl 1-amino-4-phenyl-1,2,3,4-tetrahydro - naphthalene 4-carboxylate hydrochloride.

A suspension of 7.1 g. of 4-phenyl-1,2,3,4-tetrahydro- 1,4-ethano-isoquinolin-3-one and an excess (about 3 to 4 g.) of sodium hydride (in the form of a 53 percent sodium hydride suspension in mineral oil) in 500 ml. of toluene is refluxed and stirred for a half-hour. After cooling, 30 ml. of methyl iodide is added and refluxing is continued for 8 to 10 hours while stirring. The cold mixture is filtered, the filtrate is diluted with diethyl ether and then washed with water, dried over magnesium sulfate, filtered and evaporated. The residue is triturated with diethyl ether to yield 7.1 g. of the crystalline 2-methyl - 4 - phenyl-1,2,3,4-tetrahydro-1,4-ethano-isoquinolin-3-one of the formula

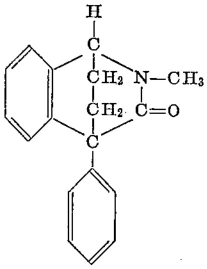

vhich melts at 198.5–201.5° after recrystallization from ı mixture of ethyl acetate and methanol, and analyzes as ollows:

Calcd. for $C_{18}H_{17}ON$: C, 82.10; H, 6.51; N, 5.32. Found: C, 82.13; H, 6.47; N, 5.30.

Its infrared absorption spectrum (taken in mineral oil) hows a characteristic band at 6.01μ.

To a Grignard reagent, prepared from 1.2 g. of magesium turnings and 7 ml. of methyl iodide in 50 ml. of lry diethyl ether, is added 1.7 g. of the 2-methyl-4-phenyl-,2,3,4-tetrahydro-1,4-ethano-isoquinolin-3-one in 220 ml. of toluene. The reaction mixture is boiled for about thirty ninutes to remove low boiling materials, and upon reachng a temperature of 95–100°, the reaction mixture is efluxed for two hours and then heated overnight on a team bath under a reflux condenser. The resulting gray uspension is treated with water, then with a dilute soluion of 6 ml. of glacial acetic acid. Diethyl ether is added, he mixture is shaken and the layers are separated. The veakly acidic aqueous solution is made basic with potasium carbonate, and the organic material is extracted with iethyl ether. The organic solution is washed three times vith water, dried over potassium carbonate, filtered and vaporated to yield a yellow, semi-crystalline material epresenting the desired 2-methyl-3-methylene-4-phenyl-,2,3,4-tetrahydro-1,4-ethano-isoquinoline of the formula

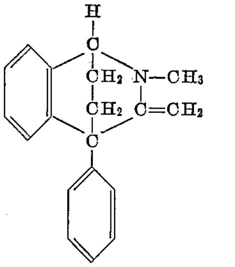

ıe infrared absorption spectrum of which is almost idencal with that of the compound obtained according to the ocedure of Example 3. It is used without further puriation.

The above 2-methyl-3-methylene-4-phenyl-1,2,3,4-trahydro-1,4-ethano-isoquinoline is characterized as folws: A mixture of about 0.5 g. of 2-methyl-3-methylene-phenyl-1,2,3,4-tetrahydro-1,4-ethano - isoquinoline and ) ml. of methyl iodide, containing a small amount of hanol is boiled on the steam bath for ten minutes. fter cooling, a small amount of dry diethyl ether is lded; the resulting oily material is washed with diethyl her by decanting the solvent, and is then crystallized , taking it up in a small amount of methanol and adding dry diethyl ether until turbidity. The crystalline 2,2-dimethyl-3-methylene-4-phenyl-1,2,3,4-tetrahydro - isoquinolinium iodide of the formula

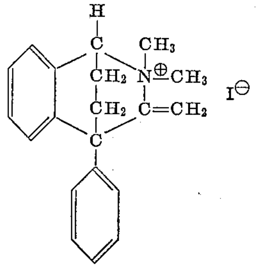

is filtered off, washed wtih diethyl ether and recrystallized once from ethanol and twice from a mixture of ethanol and diethyl ether to yield the monohydrate, M.P. 259–263° (with decomposition). It analyzes as follows:

Calcd. for $C_{20}H_{22}NI \cdot H_2O$: C, 57.01; H, 5.74; N, 3.32. Found: C, 57.76; H, 6.04; N, 3.34; and its infrared absorption spectrum (taken in mineral oil) shows a strong OH band, and peaks at 4.97–4.98μ and 6.23μ.

The 2-methyl-3-methylene-4-phenyl-1,2,3,4-tetrahydro-1,4-ethano-isoquinoline is also prepared as follows: To 1.0 g. of 2-methyl-4-phenyl-1,2,3,4-tetrahydro-1,4-ethano-isoquinolin-3-one are added 24 ml. of a 1.92 molar solution of methyl lithium in diethyl ether, and then 150 ml. of benzene. The reaction mixture is refluxed for one hour, whereupon a yellow precipitate is formed, and, after cooling, is diluted with cold water. The organic material is extracted with diethyl ether, the organic solution is washed twice with water and is then extracted with two portions of a 1:1-mixture of concentrated hydrochloric acid and water. After chilling, the acidic extracts are made basic with an aqueous solution of sodium hydroxide; a precipitate forms upon cooling, which is filtered off and washed with water to yield 1.1 g. of the 2-methyl-3-methylene-4-phenyl-1,2,3,4 - tetrahydro - 1,4-ethano-isoquinoline, which melts at 172–175° (with decomposition) after recrystallization from diethyl ether.

*Example 10*

A solution of the crude 3-n-butylidene-2-methyl-4-phenyl-1,2,3,4-tetrahydro-1,4-ethano - isoquinoline (prepared according to the procedure described below) in dry diethyl ether is treated with ethanolic hydrogen chloride until no further precipitate is formed. The crude 3-n - butyl-2-methyl-4-phenyl-1,2,3,4-tetrahydro-1,4-ethano-isoquinolinium chloride of the formula

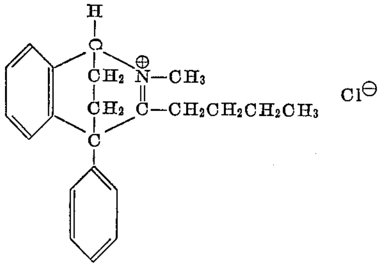

is collected, and after the addition of a small amount of ethanol, washed with diethyl ether containing some ethanol, and recrystallized from diethyl ether and ethanol. It melts as the hemihydrate, M.P. 242–244° (with decomposition) after drying at 80° under reduced pressure, and analyzes as follows:

Calcd. for $C_{22}H_{26}ClN \cdot \frac{1}{2}H_2O$: C, 75.73; H, 7.80; N, 4.01. Found: C, 75.78; H, 7.77; N, 3.91. Its infrared absorption spectrum (taken in mineral oil) shows the hydroxyl band and a sharp peak at 6.06μ.

The starting material used in the above procedure is prepared as follows: A mixture of 1.3 g of 2-methyl-4-phenyl-1,2,3,4-tetrahydro-1,4-ethano-isoquinolin-3-one in 100 ml. of toluene is treated with 30 ml. of an about 10 percent n-butyl lithium solution in hexane. The exothermic reaction yields an orange-colored solution, which is refluxed for 1½ hours, and is then cooled, treated with cold water and extracted with diethyl ether. The organic solution is washed three times with water, dried over potassium carbonate and evaporated to yield the non-crystalline 3-n-butylidene-2-methyl-4-phenyl-1,2,3,4-tetrahydro-1,4-ethano-isoquinoline of the formula

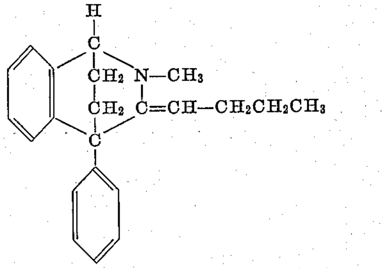

which is used without further purification.

*Example 11*

A solution of about 4.0 g. of 3-ethylidene-2-methyl-4-phenyl-1,2,3,4-tetrahydro - 1,4 - ethano-isoquinoline (prepared according to the procedure described below) in about 100 ml. of diethyl ether is treated with ethanolic hydrogen chloride until the precipitation of the crystalline material is complete. The latter is collected, washed with diethyl ether containing a small amount of ethanol and is recrystallized from a mixture of ethanol and diethyl ether to yield a total of 2.5 g. of the 3-ethyl-2-methyl-4-phenyl-1,4-dihydro-1,4-ethano-isoquinolinium chloride of the formula

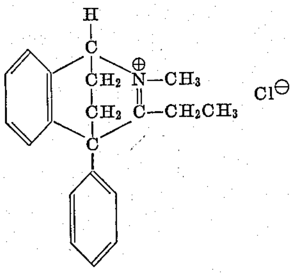

which melts as the monohydrate at 239–240° (with decomposition) after recrystallization from a mixture of ethanol and diethyl ether and drying at 80° under reduced pressure. It analyzes as follows:

Calcd. for $C_{20}H_{24}ClN \cdot H_2O$: C, 72.82; H, 7.33; N, 4.25. Found: C, 73.66; H, 7.40; N, 4.16; and its infrared absorption spectrum (taken in mineral oil) shows a broad OH band and a sharp peak at 6.07μ.

The starting material used in the above procedure is prepared as follows: A solution of 3.9 g. of 2-methyl-4-phenyl-1,2,3,4-tetrahydro-1,4-ethano-isoquinoline-3-one in 200 ml. of reagent benzene is treated with 24 ml. of a 2.1 molar solution of ethyl lithium in benzene. The mildly exothermic reaction forms an orange solution, which is allowed to stand at room temperature for three hours, and is then refluxed for thiry minutes. After being worked up as described in Example 10, the reaction mixture yields about 5.0 g. of the crude 3-ethylidene-2-methyl-4-phenyl-1,2,3,4-tetrahydro-1,4-ethano-isoquinoline of the formula

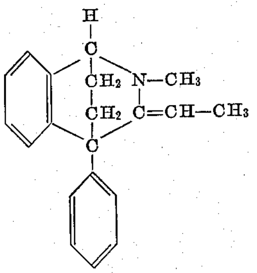

which is obtained crystalline and melts at 107–109° after three recrystallizations from anhydrous diethyl ether. It analyzes as follows:

Calcd. for $C_{20}H_{21}N$: C, 87.22; H, 7.69; N, 5.09. Found: 7, 87.67; H, 7.86; N, 5.11; and its infrared absorption spectrum (taken in mineral oil) shows a moderate, sharp peak at 6.04μ and a weaker peak at 6.23μ, with no indication of an NH or an OH band.

*Example 12*

A solution of 0.2 g. of 3-ethylidene-2-methyl-4-phenyl-1,2,3,4-tetrahydro-1,4-ethano-isoquinoline in diethyl ether is treated gradually with 1 ml. of concentrated hydriodic acid (about 57%) in 5 ml. of ethanol. The resulting crystalline material is filtered off and washed with diethyl ether to yield the 3-ethyl-2-methyl-4-phenyl-1,4-dihydro-1,4-ethano-isoquinolinium iodide, which melts at 235.5–237.5° and analyzes as follows:

Calcd. for $C_{20}H_{22}NI$: C, 59.56; H, 5.50; N, 3.47. Found: C, 59.09; H, 6.04; N, 3.20.

The infrared absorption spectrum (taken in mineral oil) shows an OH band (indicating some hydration) and a peak at 6.05μ.

*Example 13*

To a solution of 0.2 g. of 2-methyl-3-methylene-4-phenyl-1,2,3,4-tetrahydro-1,4-ethano-isoquinoline in dry diethyl ether is added 2 ml. of benzyl bromide. After standing at room temperature, the reaction mixture is warmed on the steam bath until the ether is evaporated; the oily residue crystallizes after ten minutes on the steam bath and is allowed to stand for twenty hours. It is suspended in dry diethyl ether, filtered off and washed with diethyl ether to yield the 2,3-dimethyl-4-phenyl-1,4-dihydro-1,4-ethano-isoquinolinium bromide which melts as the hemihydrate at 252–254° (with decomposition) after recrystallization from a mixture of ethanol and diethyl ether. It analyzes as follows:

Calcd. for $C_{19}H_{20}NBr \cdot \frac{1}{2}H_2O$: C, 64.96; H, 6.03; N, 3.99. Found: C, 64.86; H, 6.25; N, 3.94; and shows a broad OH band and a sharp peak of 6.05μ in the infrared absorption spectrum (taken in mineral oil).

*Example 14*

A solution of 2.0 g. of 3-methyl-4-phenyl-1,4-dihydro-1,4-ethano-isoquinoline and 15 ml. of ethyl bromoacetate in 30 ml. of ethanol is refluxed for thirty minutes. After concentrating the reaction mixture the remaining solvent is decanted from the partly crystalline product, which is triturated with diethyl ether to yield 3.2 g. of the 2-carbethoxymethyl - 3 - methyl - 4 - phenyl - 1,4 - dihydro-1,4-ethano-isoquinolinium bromide of the formula

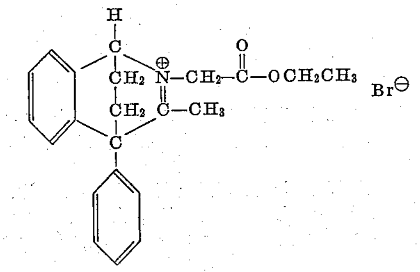

which melts at 186–187° (with decomposition) after recrystallization from a mixture of ethanol and diethyl ether. It analyzes as follows:

Calcd. for $C_{22}H_{24}BrNO_2$: C, 63.77; H, 5.84; N, 3.38. Found: C, 64.03; H, 5.92; N, 3.25; and its infrared absorption spectrum (taken in mineral oil) shows peaks at 5.71μ and 6.09μ.

*Example 15*

To a solution of 1.0 g. of 2-carbethoxymethyl-3-methyl-4-phenyl-1,4-dihydro - 1,4-ethano-isoquinolinium bromide in 75 ml. of water is added 50 ml. of a 5 percent aqueous solution of potassium hydroxide. The resulting oily material is extracted with three portions of diethyl ether, the organic solution is washed with two portions of water, dried over potassium carbonate and evaporated under reduced pressure while maintaining the temperature below 40°. The resulting 2-carbethoxymethyl - 3 - methylene-4-phenyl-1,2,3,4-tetrahydro-1,4-ethano-isoquinoline of the formula

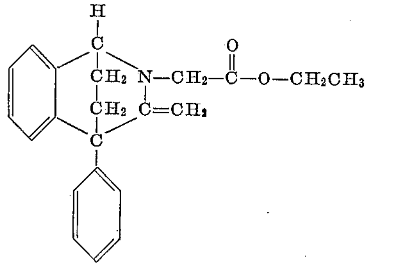

is obtained in the form of an oil and is used without further purification.

A solution of the above oily base in 50 ml. of dry diethyl ether is treated with 1 ml. of a 5 percent ethanol solution of hydrogen chloride. The oily material is separated, decanted several times with diethyl ether and then dissolved in about 3 ml. of ethanol. The solution is diluted with 50 ml. of diethyl ether, and the desired 2-carbethoxymethyl-3-methyl-4-phenyl-1,4-dihydro-1,4-ethano - isoquinolinium chloride crystallizes upon scratching. After being washed with diethyl ether containing a small amount of ethanol and dried, the hygoscopic compound melts at 184–185° (with decomposition), and analyzes as follows:

Calcd. for $C_{22}H_{24}ClNO_2 \cdot \frac{2}{3}H_2O$: C, 69.19; H, 6.68; N, 3.67. Found: C, 69.14; H, 6.92; N, 3.72.

Its infrared absorption spectrum (taken in mineral oil) shows a broad OH band and peaks at 5.75$\mu$ and 6.07–6.12$\mu$; and its ultraviolet absorption spectrum (taken in ethanol) shows $\lambda_{max.}$ at 257 m$\mu$ ($\epsilon$=1,010); at 260 m$\mu$ ($\epsilon$=930), and at 263 m$\mu$ ($\epsilon$=263), and shoulders at 240 m$\mu$, 250 m$\mu$ and 266 m$\mu$.

*Example 16*

The 3,4-dimethyl-1,4-dihydro - 1,4 - ethano-isoquinoline prepared according to the procedure described below is reacted with an excess of methyl iodide. After evaporating the reagent the residue is crystallized from a mixture of ethanol and diethyl ether to yield the 2,3,4-trimethyl-1,4-dihydro-1,4-ethano-isoquinolinium iodide of the formula

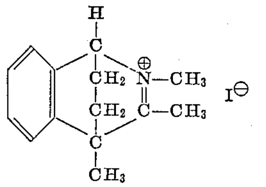

which melts at 213–215° (with decomposition) after recrystallization from ethanol and diethyl ether. It analyzes as follows:

Calcd. for $C_{14}H_{18}IN$: C, 51.39; H, 5.54; N, 4.28. Found: C, 51.27; H, 5.46; N, 4.20; and its infrared absorption spectrum (taken in mineral oil) shows a sharp peak at 6.06$\mu$.

The starting material used in the above procedure is prepared as follows: A solution of 122.0 g. of phenylacetone in 400 ml. of dry diethyl ether is added over a period of fifteen minutes to a stirred, ice chilled suspension of sodium methoxide (prepared from 23.0 g. of sodium) in 300 ml. of diethyl ether. After twenty minutes, a total of 128.0 ml. of methyl iodide is added over a period of fifteen minutes. The ice-bath is then removed, and the reaction mixture is stirred for six hours. The inorganic precipitate is filtered off, the organic solution is washed with water, dried over magnesium sulfate, and evaporated. The crude 3-phenyl-2-butanone is used without further purification; its semicarbazone melts at 175–176° after recrystallization from ethanol.

A solution of all but about 1.0 g. of the above 3-phenyl-2-butanone in 500 ml. of tetrahydrofuran is cooled to 20°, and treated with 30 ml. of a 40 percent of benzyl-trimethylammonium methoxide in methanol and then over a period of fifteen minutes with a solution of 47.6 g. of acrylonitrile in 100 ml. of tetrahydrofuran while keeping the temperature at 20–30° by cooling, if necessary. After standing at room temperature for two hours, the reaction mixture is treated with diluted hydrochloric acid, ice and water; the resulting $\gamma$-acetyl-$\gamma$-phenyl-valeronitrile is extracted with diethyl ether and is used without further purification.

The crude $\gamma$-acetyl-$\gamma$-phenyl-valeronitrile in 2200 ml. of a 1:1-mixture of concentrated hydrochloric acid and glacial acetic acid is refluxed for three hours. A portion of the solvent is distilled off, the residue is treated with ice and water, and the organic material is extracted with diethyl ether. The organic solution is washed with water, then extracted with a dilute aqueous solution of potassium hydroxide; the basic solution is acidified with hydrochloric acid, and the organic material is reextracted with diethyl ether. The organic solution is washed with water, dried and evaporated to yield 162.0 g. of the crude $\gamma$-acetyl-$\gamma$-phenyl-valeric acid, which is purified by distillation and collected at 174–176.5°/0.6 mm. It crystallizes and is recrystallized from diethyl ether, M.P. 73–74°.

A solution of 25.0 g. of $\gamma$-acetyl-$\gamma$-phenyl-valeric acid in 500 ml. of concentrated sulfuric acid is allowed to stand overnight at room temperature, and is then poured onto ice. The organic material is extracted with diethyl ether, and separated into a neutral and an acidic fraction as described before to yield 7.0 g. of recovered starting material and 14.4 g. of the desired 4-acetyl-4-methyl-1,2,3,4-tetrahydro-naphthalen-1-one of the formula

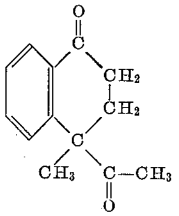

which is obtained in the form of a pale-yellow oil, and is used without further purification. Its infrared absorption spectrum (taken in mineral oil) shows peaks at 5.86$\mu$ and 5.93$\mu$, and no indication of a monosubstituted phenyl band. The mono-2,4-dinitro-phenyl-hydrazone melts at 193–195° after recrystallizations from a mixture of ethanol and ethyl acetate and from ethyl acetate, and analyzes as follows:

Calcd. for $C_{19}H_{18}N_4O_5$: C, 59.68; H, 4.75. Found: C, 59.83; H, 4.90.

A solution of 14.4 g. of 4-acetyl-4-methyl-1,2,3,4-tetrahydro-naphthalen-1-one in 240 ml. of ethanol is treated with a hydroxylamine solution, prepared from 51.0 g. of hydroxylamine hydrochloride and 18.0 g. of sodium hydroxide in 360 ml. of water. After refluxing for fifteen minutes, and cooling, the resulting 4-acetyl-4-methyl-1,2,3,4-tetrahydro-naphthalen-1-one dioxime of the formula

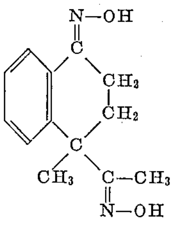

is filtered off, washed with aqueous ethanol and air-dried, it melts at 224–226° after recrystallization from ethanol, and analyzes as follows:

Calcd. for $C_{13}H_{16}N_2O_2$: C, 67.22; H, 6.94; N, 12.06. Found: C, 67.07; H, 6.91; N, 12.18.

Its infrared absorption spectrum (taken in mineral oil) shows a broad and strong peak at 3.09$\mu$, a weak band at 6.08$\mu$ and no ketone band.

A mixture of 11.6 g. of 4-acetyl-4-methyl-1,2,3,4-tetrahydro-naphthalen-1-one dioxime and 2.3 g. of a palladium catalyst (5 percent palladium on charcoal) in 300 ml. of ethanol is shaken at room temperature in an atmosphere of hydrogen with an initial pressure of about 3½ atmospheres. The hydrogenation is interrupted after the absorption of 2.28 molar equivalents, the catalyst is filtered off, and the solvent is evaporated. The crude oil is triturated with diethyl ether to yield 0.6 g. of unreacted 4-acetyl-4-methyl-1,2,3,4-tetrahydro-naphthalen-1-one dioxime, and the organic solution is extracted with aqueous hydrochloric acid. The chilled acidic extract is carefully treated with an aqueous solution of potassium hydroxide. The resulting oil is extracted with diethyl ether, washed with water, dried over potassium carbonate and evaporated to yield 5.0 g. of a crude material.

A solution of 3.0 g. of this product is dissolved in a mixture of ethyl acetate and n-butanol is treated with ethanolic hydrogen chloride. The crystalline material is collected in several crops (yield: 0.85 g.) and recrystallized from a mixture of methanol and diethyl ether to give the 3,4-dimethyl-1,4-dihydro-1,4-ethano-isoquinoline hydrochloride of the formula

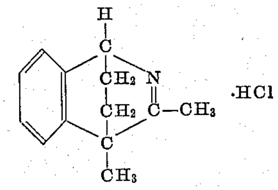

which, after drying at 65° under reduced pressure, melts at 234–245°, solidifies and remelts at 298–301° (with decomposition). It analyzes as follows:

Calcd. for $C_{13}H_{16}ClN$: C, 70.42; H, 7.27; N, 6.32. Found: C, 70.70; H, 7.35; N, 6.25; and its infrared spectrum (taken in mineral oil) shows a peak at 5.99$\mu$ and pronounced immonium salt bands at 4.96$\mu$ and 5.28$\mu$. The properties and spectral data of this compound indicate that part of the compound is in the enamine form of the 4-methyl-3-methylene-1,2,3,4-tetrahydro-1,4-ethano-isoquinoline hydrochloride of the formula

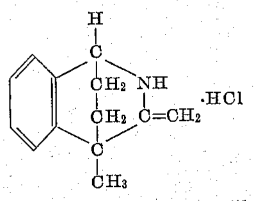

The amount of 3,4-dimethyl-1,4-dihydro-1,4-ethano-isoquinoline hydrochloride obtained from two reductions of 4-acetyl-4-methyl-1,2,3,4-tetrahydro-naphthalen-1-one dioxime, each using 10.0 g. of the starting material, according to the previously described procedure, is dissolved in a small amount of water, washed with diethyl ether, and made basic with an aqueous solution of potassium hydroxide while cooling to 0°. The precipitate is filtered off, washed with ice water and dried under reduced pressure to yield the desired 3,4-dimethyl-1,4-dihydro-1,4-ethano-isoquinoline, which melts at 38–39°. Its recrystallization is unfeasible; its infrared absorption spectrum (taken in mineral oil) shows a sharp peak at 6.11$\mu$.

*Example 17*

A mixture of 3,4-dimethyl-1,4-dihydro-1,4-ethano-isoquinoline and an excess of benzyl bromide, as well as a small amount of ethanol, is warmed on the steam bath. The crystalline material is isolated by trituration of the reaction product with a mixture of ethanol and diethyl ether; the colorless 2-benzyl-3,4-dimethyl-1,4-dihydro-1,4-ethano-isoquinolinium bromide of the formula

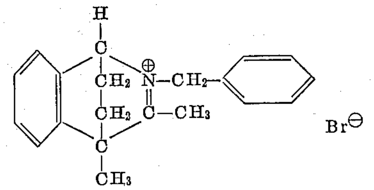

melts at 235–237° (with decomposition) and is water-soluble. It analyzes as follows:

Calcd. for $C_{20}H_{22}BrN$: C, 67.41; H, 6.23; N, 3.93. Found: C, 67.55; H, 6.22; N, 3.77; and its infrared absorption spectrum (taken in mineral oil) shows a peak at 6.08$\mu$.

*Example 18*

A solution of 0.4 g. of 2-methyl-3-methylene-1,2,3,4-tetrahydro-1,4-ethano-isoquinoline in diethyl ether is filtered and gradually treated with a solution of 1 ml. of concentrated hydriodic acid (53 percent) in 5 ml. of ethanol until no further precipitation is observed. The orange precipitate is filtered off, washed once with diethyl ether and dissolved in a minimum amount of warm ethanol. Upon standing, the desired 2,3-dimethyl-1,4-dihydro-1,4-ethano-isoquinolinium iodide of the formula

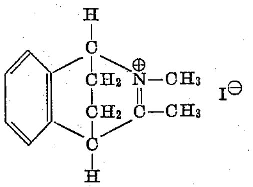

crystallizes, is filtered off and recrystallized from ethanol, M.P. 217.5–219.5° (with decomposition). It analyzes as follows:

Calcd. for $C_{13}H_{16}NI$: C, 49.85; H, 5.15; N, 4.47; Found: C, 49.64; H, 5.30; N, 4.24; and its infrared absorption spectrum shows a sharp peak at 6.01$\mu$.

In a second experiment using 1.1 g. of the 2-methyl-3-methylene-1,2,3,4-tetrahydro-1,4-ethano-isoquinoline and reacting it with a concentrated hydriodic acid, 1.0 g. of the desired 2,3-dimethyl-1,4-dihydro-1,4-ethano-isoquinolinium iodide is obtained.

The starting material used in the above procedure is prepared as follows: To a suspension of sodium methoxide (prepared from 4.6 g. of sodium) in 1000 ml. of tertiary butanol is added 164.0 g. of ethyl phenylacetate, followed, over a period of five minutes, by 86.1 g. of methyl acrylate while stirring. The deep red-brown solution is allowed to stand for 1½ hours and is then concentrated under reduced pressure to a volume of about 350 ml. After cooling, the reaction mixture is poured onto ice, and is extracted with diethyl ether; the organic solution is washed with water until neutral, dried over magnesium sulfate, and evaporated to yield 240.0 g. of the crude methyl $\alpha$-carbethoxy-$\alpha$-phenyl-butyrate, which is used without further purification.

A mixture of 240.0 g. of methyl $\alpha$-carbethoxy-$\alpha$-phenyl-butyrate and 2000 ml. of a 10 percent aqueous solution of potassium hydroxide is refluxed for about two hours, allowed to stand overnight and again refluxed for 1½ hours. An additional 150.0 g. of potassium hydroxide in 300 ml. of water, and 30 ml. of ethanol are added, and refluxing is continued for 5¼ hours until a clear solution is obtained. After cooling, it is washed with diethyl ether, and rendered acidic with a mixture of concentrated hydrochloric acid and ice. The oily $\alpha$-phenyl-glutaric acid is extracted with diethyl ether; the organic solution is washed several times with water, dried over magnesium sulfate and evaporated to yield 194.0 g. of the crude oily product, which is used without further purification.

A mixture of 97.0 g. of the crude α-phenyl-glutaric acid and 100 ml. of acetic anhydride is refluxed for one hour, and the excess of the reagent is removed by distillation under reduced pressure until the temperature rises to about 143° at atmospheric pressure. The remaining α-phenyl-glutaric anhydride is recovered by distillation and is collected at 170–180°/0.5–0.7 mm. It crystallizes rapidly and melts at 92–95° after recrystallization from a small amount of ethyl acetate.

A mixture of 39.0 g. of α-phenyl-glutaric anhydride and 250 ml. of concentrated sulfuric acid is heated to 65–70° for one-half hour and is allowed to stand at room temperature overnight. It is then poured onto ice, and the viscous oily material is extracted with diethyl ether. The organic solution is washed with several portions of water, dried over magnesium sulfate, and evaporated to yield 36.0 g. of the oily 1,2,3,4-tetrahydro-naphthalen-1-one 4-carboxylic acid, which crystallizes from diethyl ether, M.P. 94–96°; yield: 23.5 g.

A mixture of 39.9 g. of 1,2,3,4-tetrahydro-naphthalen-1-one 4-carboxylic acid and a solution of 54 ml. of concentrated sulfuric acid and 3.6 ml. of 30 percent oleum in 1500 ml. of absolute ethanol is refluxed for three hours. The excess of ethanol is removed by distillation under reduced pressure, and the residue is poured over ice. The aqueous mixture is extracted with diethyl ether; the organic extract is washed with three portions of water, a dilute aqueous solution of sodium hydroxide, and again with water, dried over magnesium sulfate, and evaporated to yield 24.9 g. of the oily ethyl 1,2,3,4-tetrahydro-naphthalen-1-one 4-carboxylate. Its semicarbazone melts at 179.5–180.5° after recrystallization from methanol, and its 2,4-dinitro-phenyl-hydrazone at 156.5–158.5° after recrystallization from ethyl acetate.

A solution of 20.0 g. of ethyl 1,2,3,4-tetrahydro-naphthalen-1-one 4-carboxylate and 50 g. of hydroxylamine hydrochloride in 200 ml. of water containing 20.0 g. of sodium hydroxide and 130 ml. of ethanol is refluxed for one hour. Upon cooling and diluting the reaction mixture with water, an oily material separates, which is extracted with diethyl ether; the organic solution is washed with three portions of water, dried over magnesium sulfate, and evaporated to yield 21.9 g. of the non-crystalline ethyl 1-hydroxyimino-1,2,3,4-tetrahydro-naphthalene 4-carboxylate. Its infrared absorption spectrum (taken in mineral oil) has a broad hydroxyl band, an ester peak at 5.82μ and no ketone peak.

A mixture of 24.0 g. of ethyl 1-hydroxyimino-1,2,3,4-tetrahydro-naphthalene 4-carboxylate in 300 ml. of ethanol and about 15.0 g. of Raney nickel (wet with water) is treated with hydrogen at an initial pressure of 3½ atmospheres. After the uptake of 2 molar equivalents of hydrogen (about 1¼ hours), the reaction is interrupted, the catalyst is filtered off, and the filtrate is evaporated to yield 22.1 g. of the oily ethyl 1-amino-1,2,3,4-tetrahydro-naphthalene 4-carboxylate, representing the non-crystalline mixture of the cis- and the trans-isomer.

A total of 22.1 g. of the above crude mixture of the cis- and the trans-isomer of ethyl 1-amino-1,2,3,4-tetrahydro-naphthalene 4-carboxylate in an open vessel is heated on a steam bath for two days. The crystalline material, which gradually separates, is removed by trituration with diethyl ether to yield four crops for a total of 12.4 g. of 1,2,3,4-tetrahydro-1,4-ethanoisoquinolin-3-one of the formula

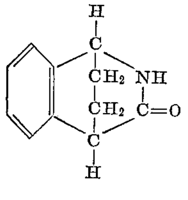

which melts at 200–201° after recrystallization from methanol. It analyzes as follows:

Calcd. for $C_{11}H_{11}NO$: C, 76.27; H, 6.40; N, 8.09. Found: C, 76.26; H, 6.45; N, 7.97; and shows the following peaks in the infrared absorption spectrum (taken in mineral oil): 3.13μ and 5.98–6.10μ.

A mixture of 5.2 g. of 1,2,3,4-tetrahydro-1,4-ethano-isoquinolin-3-one in 180 ml. of toluene, 3.37 g. of a 56 percent suspension of sodium hydride in mineral oil and 20 ml. of methyl iodide is refluxed for seven hours while stirring, and is then allowed to stand overnight at room temperature. After filtration, the reaction mixture is washed twice with water, dried over magnesium sulfate and evaporated. The residual oil crystallizes upon adding a small amount of diethyl ether to yield 5.2 g. of the crystalline 2-methyl-1,2,3,4-tetrahydro-1,4-ethano-isoquinolin-3-one of the formula

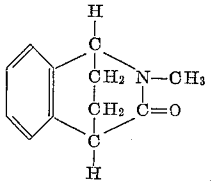

which melts at 133–135° after recrystallization from diethyl ether. It analyzes as follows:

Calcd. for $C_{12}H_{13}NO$: C, 76.97; H, 7.00; N, 7.48. Found: C, 77.29; H, 7.07; N, 7.28; and its infrared absorption spectrum (taken in ethanol) shows a peak at 6.00μ and no NH-bands.

A solution of 2.6 g. of 2-methyl-1,2,3,4-tetrahydro-1,4-ethano-isoquinolin-3-one in 100 ml. of benzene is treated with 10.5 ml. of a 1.92 molar solution of methyl lithium in diethyl ether. After the exothermic reaction subsides, the reaction mixture is allowed to stand overnight at room temperature; it is then chilled and poured into cold water and extracted with diethyl ether. The organic solution is washed twice with water and is then extracted with two portions of 25 ml. each of a 1:1-mixture of concentrated hydrochloric acid and water. The acidic extracts are made basic with a concentrated aqueous solution of sodium hydroxide while chilling in an ice bath; the resulting colorless oil is extracted with diethyl ether, and the organic solution is washed with water, dried over potassium carbonate and evaporated without appreciable heating to yield 1.2 g. of the 2-methyl-3-methylene-1,2,3,4-tetrahydro-1,4-ethano-isoquinoline of the formula

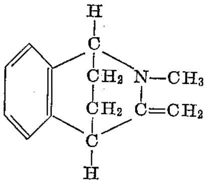

which is used without further purification.

*Example 19*

A solution of 0.4 g. of 2-methyl-3-methylene-1,2,3,4-tetrahydro-1,4-ethano-isoquinoline in diethyl ether is treated dropwise with a solution of hydrogen chloride in ethanol. The resulting oily material is washed twice with diethyl ether by decanting the solvent, dissolved in a small amount of ethanol and diluted with dry diethyl ether until turbidity. The desired 2,3-dimethyl-1,4-dihydro-1,4-ethano-isoquinolinium chloride crystallizes and is recrystallized from a mixture of ethanol and diethyl ether, M.P. 259–261° (with decomposition) after drying at 60–70° under reduced pressure.

*Example 20*

Other compounds of this invention prepared according to the previously-described and illustrated procedure by selecting the appropriate starting materials are, for example, 2-ethyl-3-methyl-4-phenyl-1,4-dihydro - 1,4 - ethano-isoquinolinium bromide, prepared by reacting 3-methyl-4-phenyl-1,4-dihydro-1,4-ethano-isoquinoline with ethyl bromide;

2-benzyl - 3 - methyl-4-phenyl-1,4-dihydro-1,4-ethano-isoquinolinium bromide, prepared by reacting 3-methyl-4-phenyl-1,4-dihydro-1,4-ethano-isoquinoline with benzyl bromide;

2,3-dimethyl-1,4-dihydro - 1,4 - ethano-isoquinolinium bromide, prepared by reacting 2-methyl-3-methylene-1,2,3,4-tetrahydro - 1,4 - ethano-isoquinoline with hydrogen bromide;

2,3-diethyl-4-phenyl-1,4-dihydro - 1,4 - ethano-isoquinolinium iodide, prepared by treating 1-hydroxyimino-4-phenyl-4-propionyl-1,2,3,4-tetrahydro - naphthalene with hydrogen in the presence of palladium on charcoal, and reacting the resulting 3-ethyl-4-phenyl-1,4-dihydro-1,4-ethano-isoquinoline with ethyl iodide;

2-(2-methoxyethyl) - 3 - methyl-4-phenyl-1,4-dihydro-1,4-ethano-isoquinolinium bromide, prepared by reacting 3-methyl-4-phenyl-1,4-dihydro - 1,4 - ethano-isoquinoline with 2-methoxyethyl bromide;

2-methyl - 3 - isopropyl - 4 - phenyl-1,4-dihydro-1,4-ethano-isoquinolinium iodide, prepared by treating 1-hydroxyimino-4-isobutyryl-4-phenyl-1,2,3,4 - tetrahydro-napthalene with hydrogen in the presence of palladium on charcoal, and reacting the resulting 3-isopropyl-4-phenyl-1,4-dihydro-1,4-ethano-isoquinoline with methyl iodide;

2-methyl-4-phenyl-3-(2 - phenylethyl)-1,4-dihydro-1,4-ethano-isoquinolinium iodide, prepared by reacting 1-hydroxyimino-4-phenyl - 4 - (β-phenylpropionyl)-1,2,3,4-tetrahydro-naphthalene with hydrogen in the presence of palladium on charcoal, and reacting the resulting 4-phenyl-3-(2-phenylethyl)-1,4-dihydro - 1,4 - ethano-isoquinoline with methyl iodide;

2,3-dimethyl - 4 - (4-methyl-phenyl)-1,4-dihydro-1,4-ethano-isoquinolinium p-toluene sulfonate, prepared by treating 4-acetyl-4-(4-methyl - phenyl) - 1,2,3,4 - tetrahydro-naphthalene-1-one dioxime with hydrogen in the presence of palladium on charcoal, and reacting the resulting 3-methyl - 4 - (4-methyl-phenyl)-1,4-dihydro-1,4-ethano-isoquinoline with methyl p-toluene sulfonate;

3,4-diethyl-2-methyl-1,4-dihydro - 1,4 - ethano-isoquinolinium iodide, prepared by treating 1-hydroxyimino-4-ethyl-4-propionyl - 1,2,3,4 - tetrahydro-naphthalene with hydrogen in the presence of palladium on charcoal, and reacting the resulting 3,4-diethyl-1,4-dihydro-1,4-ethano-isoquinoline with methyl iodide;

2-ethyl-4-(4-methoxy-phenyl)-3-phenyl - 1,4 - dihydro-1,4-ethano-isoquinolinium bromide, prepared by treating 4-benzoyl-1-hydroxyimino-4-(4-methoxy - phenyl)-1,2,3,4-tetrahydro-naphthalene with hydrogen in the presence of palladium on charcoal, and reacting the resulting 4-(4-methoxy - phenyl)-3-phenyl-1,4-dihydro-1,4-ethano-isoquinoline with ethyl bromide;

7-chloro-4-(4-chloro - phenyl) - 2,3 - dimethyl-1,4-dihydro-1,4-ethano-isoquinolinium iodide, prepared by treating 4-acetyl-7-chloro - 4 - (4-chloro-phenyl)-1,2,3,4-tetrahydro-naphthalene-1-one dioxime with hydrogen in the presence of palladium on charcoal, and reacting the resulting 7-chloro-4-(4-chloro - phenyl)-3-methyl-1,4-dihydro-1,4-ethano-isoquinoline with methyl iodide;

3-benzyl-2-methyl-7-methoxy-4-phenyl - 1,4 - dihydro-1,4-ethano-isoquinolinium methyl sulfate, prepared by treating 1-hydroxyimino-7-methoxy - 4 - phenylacetyl-4-phenyl-1,2,3,4-tetrahydro-naphthalene with hydrogen in presence of palladium on charcoal, and reacting the resulting 3-benzyl - 7 - methoxy-4-phenyl-1,4-dihydro-1,4-ethano-isoquinoline with dimethyl sulfate;

4-benzyl-2,3,6,7-tetramethyl-1,4-dihydro - 1,4 - ethano-isoquinolinium iodide, prepared by treating 4-acetyl-4-benzyl-6,7-dimethyl - 1,2,3,4 - tetrahydro-napthalene-1-one dioxime with hydrogen in the presence of palladium on charcoal, and reacting the resulting 4-benzyl-3,6,7-trimethyl-1,4-dihydro-1,4-ethano-isoquinoline with methyl iodide;

4-cyclohexyl-2,3-dimethyl - 1,4 - dihydro-1,4-ethano-isoquinolinium chloride, prepared by reacting 4-cyclohexyl-2-methyl - 1,2,3,4 - tetrahydro-1,4,-ethano-isoquinolin-3-one with methyl lithium, and treating the resulting 4-cyclohexyl-2-methyl-3-methylene - 1,2,3,4 - tetrahydro-1,4-ethano-isoquinoline with hydrogen chloride;

4-cyclopentylmethyl-3-ethyl-2-methyl - 1,4 - dihydro-1,4-ethano-isoquinolinium chloride, prepared by reacting 4-cyclopentylmethyl-2-methyl - 1,2,3,4 - tetrahydro-1,4-ethano-isoquinolin-3-one with ethyl lithium, and treating the resulting 4-cyclopentylmethyl-3-ethylidene-2-methyl-1,2,3,4-tetrahydro-1,4-ethano-isoquinoline with hydrogen chloride;

2-cyclohexylmethyl - 3 - methyl-4-phenyl-1,4-dihydro-1,4-ethano-isoquinolinium bromide, prepared by reacting 3-methyl - 4 - phenyl-1,4-dihydro-1,4-ethano-isoquinoline with cyclohexylmethyl bromide;

3-cyclohexyl-2-methyl-4-phenyl - 1,4 - dihydro - 1,4-ethano-isoquinolinium chloride, prepared by reacting 2-methyl-4-phenyl-1,2,3,4-tetrahydro - 1,4 - ethano-isoquinolin-3-one with cyclohexyl magnesium bromide, and treating the resulting 3-cyclohexylidene-2-methyl-4-phenyl-1,2,3,4-tetrahydro-1,4-ethano-isoquinoline with hydrogen chloride;

3-cyclopentylmethyl - 2,4 - diethyl - 1,4 - dihydro - 1,4-ethano-isoquinolinium bromide, prepared by reacting 2,4-diethyl - 1,2,3,4 - tetrahydro-1,4-ethano-isoquinolin-3-one with cyclopentylmethyl lithium, and treating the resulting 3-cyclopentylmethylene-2,4,-diethyl - 1,2,3,4 - tetrahydro-1,4-ethano-isoquinoline with hydrogen bromide; and the like.

*Example 21*

Pharmaceutical compositions consist essentially of a pharmacologically effective amount of a 2-R-3-$R_1$-4-$R_2$-1,4-dihydro-1,4-ethano-isoquinolinium salt of this invention, as the pharmacologically effective ingredient together with a pharmaceutically acceptable carrier, the latter usually representing the major portion of such composition.

For example, capsules, each containing 0.1 g. of 2,3-dimethyl-4-phenyl-1,4-dihydro - 1,4 - ethano-isoquinolinium iodide as the pharmacologically active ingredient, are prepared as follows (for 10,000 capsules):

| Ingredients: | G. |
|---|---|
| 2,3 - dimethyl - 4 - phenyl-1,4-dihydro-1,4-ethano-isoquinolinium iodide | 1,000.0 |
| Lactose, U.S.P. | 2,500.0 |

The lactose is placed in a suitable mixer, the 2,3-dimethyl-4 - phenyl-1,4-dihydro-1,4-ethano-isoquinolinium iodide is added, and the mixture is agitated until the powders are homogeneously distributed. Portions of 0.35 g. of the resulting mixture are then filled into No. 1 gelatine capsules.

Capsules each containing 0.5 g. of 2,3-dimethyl-4-phenyl-1,4-dihydro-1,4-ethano-isoquinolinium chloride as the pharmacologically active ingredient, are prepared as follows (for 50,000 capsules):

| Ingredients: | G. |
|---|---|
| 2,3 - dimethyl - 4-phenyl-1,4-dihydro-1,4-ethano-isoquinolinium chloride | 2,500.0 |
| Lactose, U.S.P. | 15,000.0 |

No. 1 gelatine capsules are filled with 0.35 g. each of a mixture of the ingredients prepared as described above.

Capsules, each containing 0.1 g. of 2,3-dimethyl-4-phenyl - 1,4-dihydro-1,4-ethano-isoquinolinium chloride as the pharmacologically active ingredient, are prepared as follows (for 100,000 capsules):

| Ingredients: | G. |
|---|---|
| 2,3 - dimethyl - 4-phenyl-1,4-dihydro-1,4-ethano-isoquinolinium chloride | 10,000.0 |
| Lactose, U.S.P. | 25,000.0 |

No. 1 gelatine capsules are filled with 0.35 g. each of a nixture of the ingredients prepared as described above.

*Example 22*

The pale yellow solution of 4-cyclohexylmethyl-2-nethyl - 3 - methylene-1,2,3,4-tetrahydro-1,4-ethano-isoquinoline in diethyl ether (as prepared according to the procedure described below) is treated with a slight excess of hydrogen chloride in ethanol. The solvent is decanted from the resulting precipitate; the latter is washed by decantation with diethyl ether and is then allowed to stand overnight at 0° in the presence of a small amount of a nixture of diethyl ether and ethanol. The crystalline 4-cyclohexylmethyl - 2,3 - dimethyl-1,4-dihydro-1,4-ethano-soquinolinium chloride of the formula

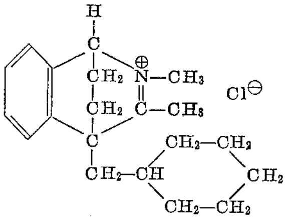

s collected and recrystallized from a mixture of ethanol nd a relatively large amount of diethyl ether and from mixture of isopropanol, ethanol and diethyl ether, using mall amounts of the alkanols to dissolve the salt and iluting the solution with diethyl ether to slight turbidity. 'he resulting crystalline material, containing water of rystallization, melts at 236–238° (with decomposition).

The starting material used in the above procedure is repared as follows: The 4-cyclohexylmethyl-2-methyl-,2,3,4 - tetrahydro - 1,4-ethano-isoquinolin-3-one of the ormula

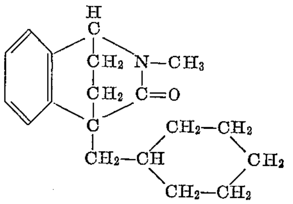

prepared according to the procedure described in Examples 9 and 18 by reacting phenylacetonitrile with odium hydride and then with cyclohexylmethyl bromide, eating the oily $\beta$-cyclohexyl-$\alpha$-phenyl-propionitrile with ethyl acrylate in the presence of benzyl-trimethyl-ammonium hydroxide in tertiary butanol, converting the rude oily methyl $\gamma$-cyano-$\delta$-cyclohexyl-$\gamma$-phenyl-valerate to the $\alpha$-cyclohexylmethyl-$\alpha$-phenyl-glutaric acid imide M.P. 150–151°, recrystallized from methanol) by refluxing it for three hours with hydrochloric acid in glacial cetic acid, hydrolyzing the imide by refluxing it for six ours with a 30 percent aqueous solution of potassium ydroxide to form the $\gamma$-carbamyl-$\delta$-cyclohexyl-$\gamma$-phenyl-aleric acid (M.P. 225–226°, recrystallized from methanol), treating the latter with concentrated sulfuric acid nd characterizing the resulting 4-cyclohexylmethyl-2,3,4-tetrahydro-naphthalen-1-one 4-carboxylic amide its oxime (M.P. 177–178°), refluxing either the ketone id or the oxime thereof with concentrated hydrochloric id in glacial acetic acid for eight hours, esterifying the sulting 4 - cyclohexylmethyl - 1,2,3,4-tetrahydro-naphthalen-1-one 4-carboxylic acid with ethanol in the presence of concentrated sulfuric acid containing fuming sulfuric acid, treating the oil ethyl 4-cyclohexylmethyl-1,2,3,4-tetrahydro-naphthalen-1-one 4-carboxylate with hydroxylamine hydrochloride in the presence of sodium hydroxide in water and ethanol, reducing the oily ethyl 4 - cyclohexylmethyl-1-hydroxyimino-1,2,3,4-tetrahydro-naphthalene 4-carboxylate with hydrogen in the presence of Raney nickel and ethanol, heating the resulting crude mixture of cis- and trans-ethyl 1-amino-4-cyclohexyl-methyl - 1,2,3,4-tetrahydro-napthalene 4-carboxylate at 100° for several days, separating the 4-cyclohexylmethyl-1,2,3,4 - tetrahydro - 1,4-ethano-isoquinolin-3-one (M.P. 186–187°, recrystallized from a mixture of methanol and diethyl ether) by trituration with diethyl ether, and reacting it with sodium hydride and methyl iodide in the presence of toluene; the resulting 4-cyclohexylmethyl-2-methyl - 1,2,3,4 - tetrahydro-1,4-ethano-isoquinolin-3-one melts at 71–73° after recrystallization from a mixture of petroleum ether and diethyl ether, and analyzes as follows:

Calcd. for $C_{19}H_{25}NO$: C, 80.52; H, 8.89; N, 4.94. Found: C, 80.80; H, 8.95; N, 4.91.

A solution of 2.15 g. of 4-cyclohexylmethyl-2-methyl-1,2,3,4-tetrahydro-1,4-ethano-isoquinolin-3-one in 250 ml. of benzene is treated with 28 ml. of a 1.92 molar solution of methyl lithium in diethyl ether, and is then refluxed for one hour and poured over ice-water. The organic material is extracted with diethyl ether; the organic extract is washed with water and is then extracted with two small portions of a 1:1-mixture of concentrated hydrochloric acid and water. The acidic aqueous extract is chilled in ice and made basic by adding concentrated aqueous sodium hydroxide. The desired 4-cyclohexylmethyl-2-methyl - 3 - methylene - 1,2,3,4-tetrahydro-1,4-ethano-isoquinoline of the formula

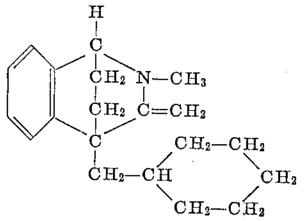

separates as a colorless oil and is extracted with diethyl ether. The organic solution is washed with water, dried over potassium carbonate, evaporated to a volume of about 100 ml. and used without further purification.

What is claimed is:

1. The compound of the formula

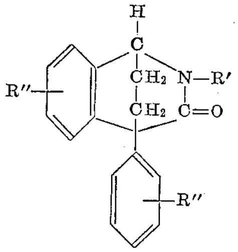

in which R is a member selected from the group consisting of hydrogen and lower alkyl, and R″ is a member selected from the group consisting of lower alkyl, lower alkoxy, halogeno and trifluoromethyl.

2. 2 - $R_1$ - 4-$R_2$-1,2,3,4-tetrahydro-1,4-ethano-isoquinolin-3-one, in which $R_1$ is a member selected from the group consisting of hydrogen and methyl and $R_2$ is a member selected from the group consisting of hydrogen and phenyl.

No references cited.

ALEX MAZEL, *Primary Examiner.*

D. G. DAUS, *Assistant Examiner.*

UNITED STATES PATENT OFFICE

CERTIFICATE OF CORRECTION

Patent No. 3,332,953 July 25, 1967

Gordon Northrop Walker

It is hereby certified that error appears in the above numbered patent requiring correction and that the said Letters Patent should read as corrected below.

Column 40, line 62, for "R" read -- R' --.

Signed and sealed this 28th day of January 1969.

(SEAL)
Attest:

Edward M. Fletcher, Jr.
Attesting Officer

EDWARD J. BRENNER
Commissioner of Patents